US011863811B2

(12) United States Patent
Stevens et al.

(10) Patent No.: US 11,863,811 B2
(45) Date of Patent: Jan. 2, 2024

(54) SENSOR-BASED MEDIA DISPLAY SYSTEM AND APPARATUS FOR MOBILE VEHICLES

(71) Applicant: ADVERGE LLC, Dover, DE (US)

(72) Inventors: Albert Stevens, St. Augustine, FL (US); Ibrahim Atiya, Tallahassee, FL (US)

(73) Assignee: ADVerge LLC, Dover, DE (US)

( * ) Notice: Subject to any disclaimer, the term of this patent is extended or adjusted under 35 U.S.C. 154(b) by 155 days.

(21) Appl. No.: 17/648,451

(22) Filed: Jan. 20, 2022

(65) Prior Publication Data
US 2022/0159330 A1 May 19, 2022

Related U.S. Application Data

(63) Continuation-in-part of application No. PCT/IB2020/056896, filed on Jul. 22, 2020.

(60) Provisional application No. 62/878,500, filed on Jul. 25, 2019.

(51) Int. Cl.
H04N 21/414 (2011.01)
H04N 21/258 (2011.01)
H04N 21/41 (2011.01)

(52) U.S. Cl.
CPC . *H04N 21/41422* (2013.01); *H04N 21/25825* (2013.01); *H04N 21/4122* (2013.01)

(58) Field of Classification Search
CPC ....... H04N 21/41422; H04N 21/25825; H04N 21/4122; G09F 27/005; G09F 21/042; H04L 67/12; H04W 4/021
See application file for complete search history.

(56) References Cited

U.S. PATENT DOCUMENTS

| | | | |
|---|---|---|---|
| 2018/0300746 A1* | 10/2018 | Terzian | G06T 7/70 |
| 2019/0101907 A1 | 4/2019 | Charr et al. | |
| 2019/0222885 A1* | 7/2019 | Cho | G06Q 30/0265 |
| 2019/0385194 A1* | 12/2019 | Binkley | G06Q 30/0267 |
| 2020/0288289 A1 | 9/2020 | Elnajjar et al. | |
| 2021/0065240 A1* | 3/2021 | Mandic | G06Q 30/0265 |
| 2021/0110426 A1* | 4/2021 | Hibbard | G06Q 30/0251 |

OTHER PUBLICATIONS

Non-Final Office Action dated Jul. 21, 2022 in related U.S. Appl. No. 17/744,182.

* cited by examiner

*Primary Examiner* — Kunal Langhnoja

(74) *Attorney, Agent, or Firm* — Daniel C. Pierron; Widerman Malek, PL

(57) ABSTRACT

Systems, techniques, and apparatuses are described for displaying digital media packages on mobile vehicles, including manned and unmanned autonomous ground and air vehicles. Apparatuses describe media display and mounting modalities in a variety of form factors, as well as component configurations for audience detection using sensor arrays. Systems and techniques describe mechanisms for selecting and displaying media packages aligned with the dynamic environmental, temporal, and geolocation conditions of client media display apparatuses.

18 Claims, 22 Drawing Sheets

MEDIA PACKAGE STORE 151

| ID 900 | MEDIA 901 | DATE RANGE 902 | TIME FRAME 903 | GEOFENCE 904 |
|---|---|---|---|---|
| 506789 | PICTURE-123.JPG | 6/15/2019 | 10:30-12:00 | 32607 |

SESSION STORE 152

| SESSION ID 910 | USER ID 911 | ID 900 | DATE 912 | START TIME 913 | STOP TIME 914 | ROUTE 915 | IMAGES / VIDEO 916 | AUDIENCE REACH 917 |
|---|---|---|---|---|---|---|---|---|
| 78301 | 335 | 506789 | 6/15/2019 | 10:45 | 12:00 | MAP-8.MAP | IMAGES.ZIP | 100-150 |

USER STORE 153

| USER ID 911 | VEHICLE TYPE 921 | STATUS 922 |
|---|---|---|
| 335 | YEAR/MAKE/MODEL | VERIFIED |

SENSOR-BASED MEDIA DISPLAY SYSTEM AND APPARATUS FOR MOBILE VEHICLES

RELATED APPLICATIONS

This application is a continuation-in-part application of and claims priority under 35 U.S.C. § 111(a) of U.S. Patent Application Serial No. PCT/IB2020/056896 filed on Jul. 22, 2020 and titled SENSOR-BASED MEDIA DISPLAY SYSTEM AND APPARATUS FOR MOBILE VEHICLES, which in turn application of and claims priority under 35 U.S.C. § 119(e) of U.S. Provisional Patent Application Ser. No. 62/878,500 filed on Jul. 25, 2019 and titled SENSOR-BASED MEDIA DISPLAY SYSTEM AND APPARATUS FOR MOBILE VEHICLES. The contents of these applications are incorporated herein by reference.

BACKGROUND

Although drivers and passengers of mobile vehicles, as well as pedestrians, have become accustomed to being presented with media such as advertisements on billboards, taxis and buses, many problems remain to be solved in the efficient and effective display of digital media to persons on or near roadways.

BRIEF SUMMARY

An apparatus is described for displaying digital media packages on a mobile vehicle, the apparatus comprising: a protective enclosure comprising a base platform and a cover affixed on top of the base platform, the cover having at least one partially transparent side; mounting hardware operable to affix the protective enclosure to the mobile vehicle; and one or more audiovisual display units housed inside the protective enclosure, wherein the one or more audiovisual display units are connected, via an interface system, to a computing system comprising the interface system, a processing system, and non-transitory computer-readable storage media.

A media display client system is described for displaying digital media packages on a mobile vehicle, the system comprising: non-transitory computer-readable storage media; a processing system; an interface system, including a communications interface and an audio-video interface; a GPS component; an object sensor component array; one or more audiovisual display units; program instructions stored on the computer-readable storage media that, when executed by the processing system, direct the processing system to: periodically, at a media package request time interval, (i) obtain GPS sensor data from the GPS component, wherein the GPS sensor data comprises location data, date data, and time data, and (ii) via the communications interface, send a media package request comprising the GPS sensor data to a media selection service; and in response to receiving, from the media selection service via the communications interface, a media package comprising an ordered set of media according to a media schedule, and media presentation parameters for each of the media including a geofence region constraint, a date range constraint, and a timeframe range constraint, initiate a media session by: determining a selected media from the ordered set of media corresponding to the media schedule and media presentation parameters; rendering the selected media on the one or more audiovisual display units; periodically, at a monitoring time interval, gathering session monitoring data comprising (i) object sensor data obtained from the object sensor component array comprising audience estimation data points, and (ii) updated GPS sensor data comprising updated location data, speed and direction data, updated date data, and updated time data obtained from the GPS component; storing the session monitoring data in a session data package on the computer-readable storage media; and if either the updated location data is outside the geofence region constraint, the updated date data is outside the date range constraint, or the updated time data is outside the timeframe range constraint, then (i) terminate the media session by at least: (a) terminating the rendering of the selected media on the one or more audiovisual display units, (b) terminating the gathering of session monitoring data, and (c) terminating the comparison of the updated GPS sensor data and the media presentation parameters; (ii) transmitting the session data package to the media management system/service via the communications interface; and (iii) initiate a next media session.

A system is described for dynamic selection of digital media for presentation at a remote device, comprising: a processing system; non-transitory computer-readable storage media; a communications interface; and program instructions stored on the computer-readable storage media that, when executed by the processing system, direct the processing system to: in response to receiving, via the communications interface, a media package request from a media display client, wherein the media package request comprises GPS sensor data including location data, date data, and time data of the media display client: select media for a media package, wherein the location data, date data, and time data match media presentation parameters for each media, the media presentation parameters comprising a geofence region constraint, a date range constraint, and a timeframe range constraint; determine, using the media and media presentation parameters for the selected media, a media schedule and arrange the media as an ordered set; send, to the media display client via the communications interface, the media package comprising the selected media arranged as the ordered set, the media schedule, and the media presentation parameters for each media in the ordered set; and in response to receiving, from the media display client, a session data package, store, on a session data store located on the computer-readable storage media, the session data package.

BRIEF DESCRIPTION OF THE DRAWINGS

FIG. 9A shows an example representation of a media package store, organized as a table in a relational database.

FIG. 9B shows an example representation of a session store, organized as a table in a relational database.

FIG. 9C shows an example representation of a user data store, organized as a table in a relational database.

DETAILED DESCRIPTION

Existing technologies for the presentation of media to persons on or near roadways have lacked methods and structure to support the display of digital media based on dynamic parameters, and the methods and technological features for the estimation of audience levels or viewership of the digital media. Systems and apparatuses are presented to facilitate the selection and display of media to audiences using mobile vehicles, as well as to dynamically adjust the selection and rendering of digital media in real-time based on location, date, time and other parameters as mobile vehicles move around. Apparatus arrangements are described to support the presentation and rendering of media sessions on mobile vehicles while they are in motion. Embodiments of systems and apparatuses described herein further include technological features for gathering data to support estimation of audience size and quality in dynamically changing physical, real-world viewing environments. Further advantageous technical effects are described below with respect to detailed embodiments.

Various classifications of media may be presented to audiences using the systems and apparatuses herein, for example, advertisements, public service announcements, entertainment offerings, and instructions and warnings.

Figure 1:
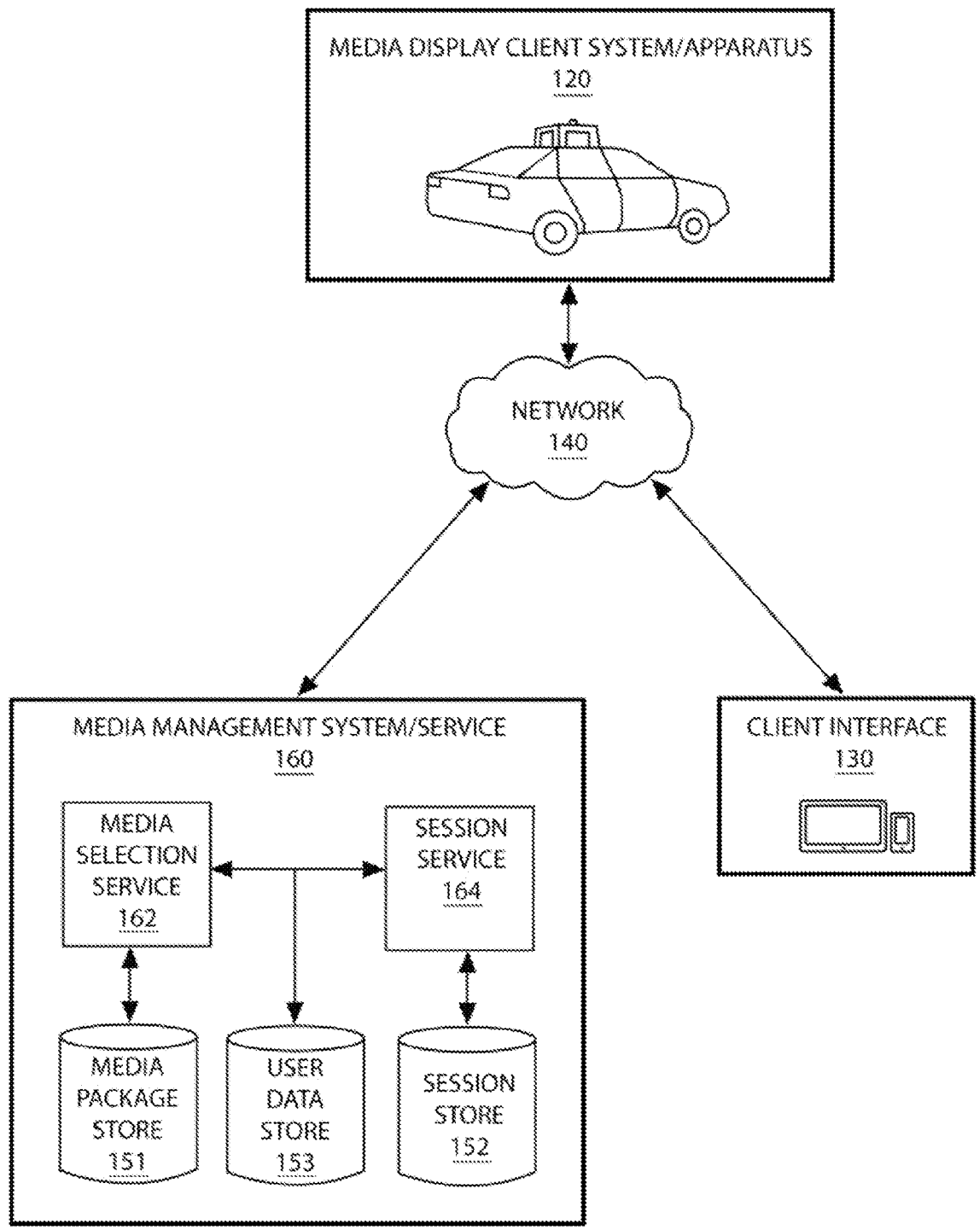
FIG. 1 shows a high-level example of a system/component environment in which some implementations of systems, apparatuses, and techniques for sensor-based media display management can be carried out.

FIG. 1 shows a high-level example of a system/component environment in which some implementations of systems, apparatuses, and techniques for sensor-based media display management can be carried out. In brief, media display client system/apparatus 120 connects to a media management system/service 160 via network 140. Media display client system/apparatus 120 is connected to client interface 130 via network 140.

Generally, media display client system/apparatus 120 is a system or apparatus composed of computing system elements, elements for displaying media, elements for detecting the location of the system/apparatus, elements for detecting the presence of viewers and other objects (e.g., obstructions), and elements for housing the computing system and attaching the apparatus to a mobile vehicle. It should be noted that media display client system/apparatus 120 has many possible configurations, numerous examples of which are described in more detail below. Media display client system/apparatus 120 performs various processing activities such as generating a media package request, receiving the media package and selecting media, rendering media on its audiovisual display units, conducting data gathering and other telemetry for audience estimation, and sending media presentation session data to a media management system/service 160. This broad description is not intended to be limiting, as the various processing activities of a media display client system/apparatus 120 are described in detail subsequently in relation to FIGS. 7A-7D.

Media management system/service 160 performs various activities, described in more detail below, to process a media package request originating from a media display client system 120, determine an appropriate media package and schedule, and send the media package to a media display client system/apparatus 120. Example process flows describing the processing activities of media management system/service 160 are described in more detail with respect to FIG. 8A-8B and elsewhere, and thus this broad description is not intended to be limiting.

Media management system/service 160 may, for example, have logical subcomponents such as service components (e.g., 162, 164) and data stores (e.g., 151, 152, 153). For example, in the example embodiment of FIG. 1, media management system/service 160 has a media selection service 162 and a session service 164. Media selection service 162 can, in conjunction with a media package store 151, perform processing activities related to determining a media package and schedule from a media package request received from a media display client system 120. A media package store 151 may house, for example, indexed media files/streams, media schedules, media presentation parameters, and other data (the discussion surrounding FIG. 9A describes a media package store in more detail).

In some embodiments, other subcomponents/subservices of 160, such as a session service 164, performs activities related to processing a session data package received from a media display client system 120—containing, for example, audience estimation data and other telemetry. A session data package may be stored by the session service 164 in a session store 152, for example (the discussion surrounding FIG. 9B describes a session store in more detail).

Either or both services 162 and 164, and/or other subcomponents of the media management system/service 160 may interact with a user data store 153, which contains user-operator account data, configuration data, and other properties of each of the media display client system(s) 120 registered to use the media management service (the discussion surrounding FIG. 9C describes a user data store in more detail).

Client interface 130 may provide a user-operator of a media display client system/apparatus 120 with various user interface elements for managing the configuration and operations of, and monitoring the status of, their media display client system/apparatus 120. Client interface 130 also connects to media management system/service 160 to provide user interface elements for performing media management functions and data review capabilities with respect to the user-operator's media display client system/apparatus 120 account. Client interface 130 may interact with subcomponents of the media management system/service 160, such as a user data store 153, to modify user-operator account information.

A client interface 130 is a computing device that can have various form factors. Non-limiting examples and embodiments of a client interface 130 include a computing system, desktop computer, mobile device, tablet device, mobile phone, wearable, an interface screen that is dash-mounted inside the mobile vehicle, and a in-dash interface device installed in the mobile vehicle running software that provides the user interface elements. Examples of a client interface 130 include devices that can use a web browser to access a web page, or that have an "app" (or other software applications), to connect to a cloud service interface over the network 140.

Network 140 can include, but is not limited to, a cellular network (e.g., wireless phone), a point-to-point dial up connection, a satellite network, the Internet, a local area network (LAN), a wide area network (WAN), a Wi-Fi network, an ad hoc network, a Bluetooth network, or a combination thereof. Such networks are widely used to connect various types of network elements, such as hubs, bridges, routers, switches, servers, and gateways. The network may include one or more connected networks (e.g., a multi-network environment) including public networks, such as the Internet, and/or private networks such as a virtual private network or secure enterprise private network. Access to the network may be provided via one or more wired or wireless access networks as will be understood by those skilled in the art. Media display client system/apparatus 120, media management system/service 160, and client interface 130 may connect to network 140 by employing one or more elements of a communications interface. Computing system and device components supporting network connectivity via a communications interface are described in detail with respect to FIG. 13.

In embodiments, components or subcomponents of the media display client system/apparatus 120 and the client interface 130 facilitate the interaction between the media display client system/apparatus 120 (and/or client interface 130) and the media management system/service 160, for example through an application programming interface (API) of the media management system/service 160. An "API" is generally a set of programming instructions and standards for enabling two or more applications to communicate with each other. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API and related components may be stored in one or more computer readable storage media. An API is commonly implemented as a set of Hypertext Transfer Protocol (HTTP) request messages and a specified format or structure for response messages according to a REST (Representational state transfer) or SOAP (Simple Object Access Protocol) architecture. JSON-formatted and XML-formatted content is often returned to the API-calling component in response messages.

It should be noted that, while sub-components of media management system/service 160 are depicted in FIG. 1, this arrangement of the media management system/service 160 into components is exemplary only; other physical and logical arrangements of a media management system/service capable of performing the operational aspects of the disclosed techniques are possible. Various types of physical or virtual computing systems may be used to implement the media management system/service 160 (and related example subcomponents 162, 164, 151, 152, and 153) such as server computers, desktop computers, cloud compute server environments, laptop computers, tablet computers, or any other suitable computing appliance. When implemented using a server computer, any of a variety of servers may be used including, but not limited to, application servers, database servers, mail servers, rack servers, blade servers, tower servers, virtualized servers, or any other type of server, variation of server, or combination thereof. A computing system or device that may be used in some environments to implement a media management system/service 160 is described in FIG. 13. Further, it should be noted that aspects of the media management system/service 160 may be implemented on more than one device. In some cases, media management system/service 160 may include components located on media display client system/apparatus device(s) 120, client interface device(s) 130, and/or on one or more services implemented on separate physical devices. For example, a subset of a media package store 151 that has been cached or replicated may exist on media display client system/apparatus 120 to provide caching of media, lowering network bandwidth demands.

Figure 1A:
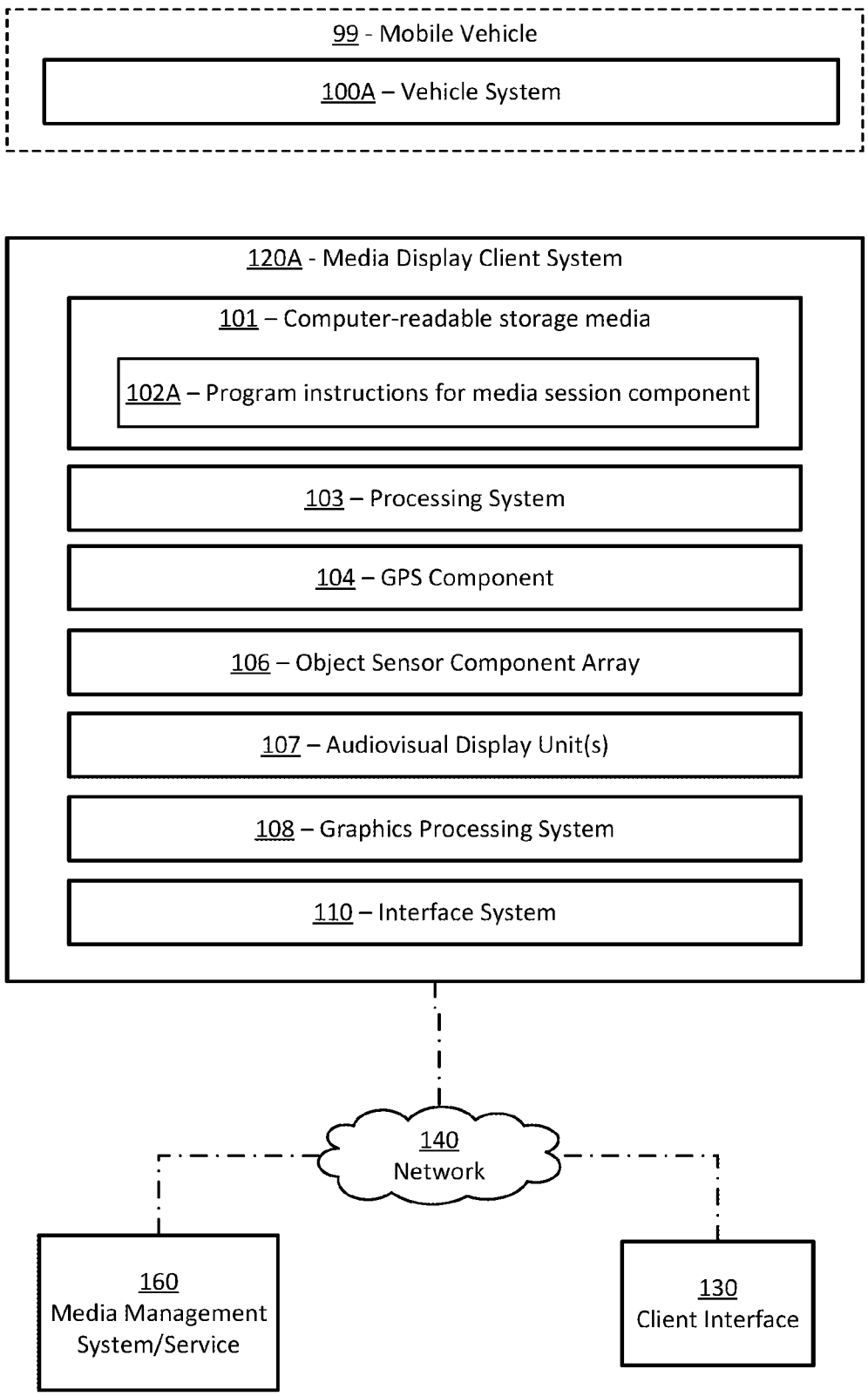
FIGS. 1A-1C show examples and embodiments of system/component environments for sensor-based media display management that have varying configurations of media display client systems.
Figure 1B:
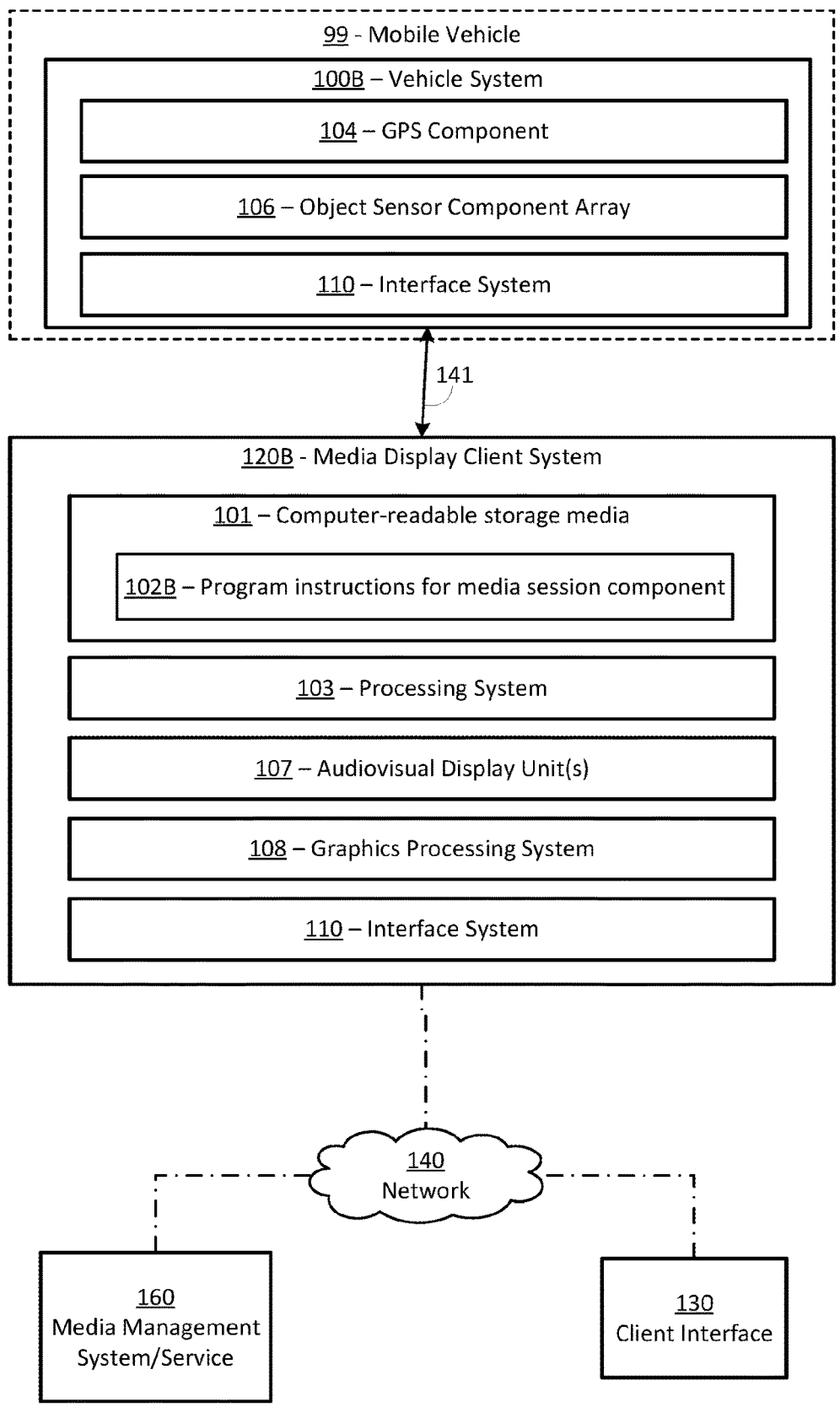
Figure 1C:
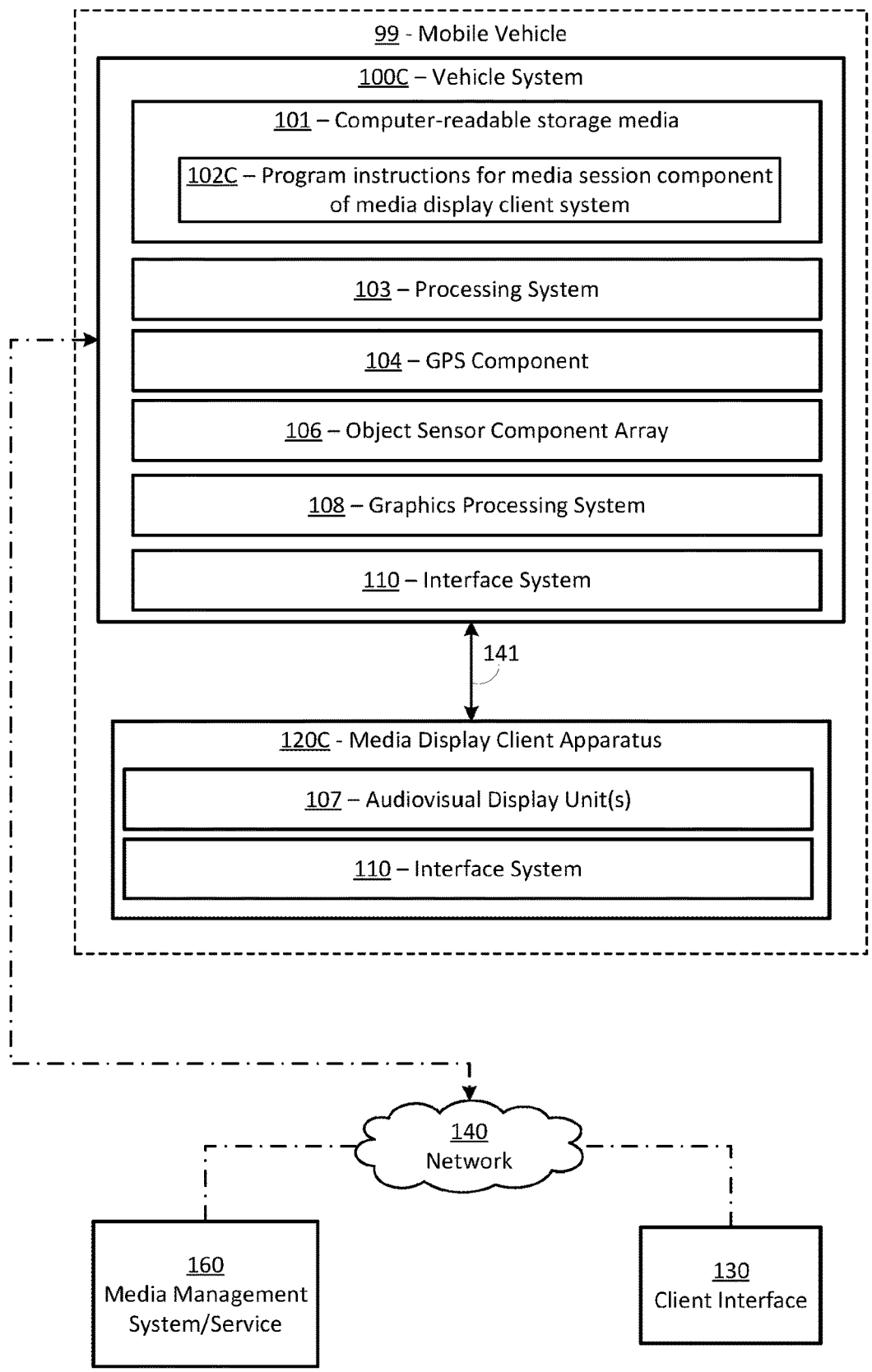

FIGS. 1A-1C show examples and embodiments of system/component environments for sensor-based media display management that have varying configurations of media display client systems 120. The FIGS. 1A-1C illustrate media display client systems 120 whose component arrangements vary from self-contained systems (e.g., FIG. 1A), to systems wherein certain components are leveraged from within, or part of, an autonomous vehicle (e.g., FIG. 1B), to systems wherein most of the computing system components are within, or part of, an autonomous vehicle (e.g., FIG. 1C). These variants of system 120 are denoted by elements 120A, 120B, and 120C in the figures.

Each of these possible configurations, and several other variations, are described in detail below. However, certain components are common to all the systems in FIGS. 1A-1C.

FIG. 1A shows an example media display client system 120A having logically and physically self-contained components. Components of media display client system 120A, for example, are housed within, on, or as part of an apparatus for displaying media packages that is attachable to a mobile vehicle 99. Embodiments and examples of such an apparatus are described in more detail below, for instance in relation to FIGS. 2-6.

Mobile vehicle 99 may have vehicle system 100A. Vehicle system 100A may have software (including an operating system), hardware, firmware, and devices for operating the mobile vehicle 99. Vehicle system 100A, for example, may include user interface software and hardware panels mounted in the dashboard, as well as various sensor componentry for autonomous driving, vehicle assisted driving, and driver hazard warning systems.

Figure 13:
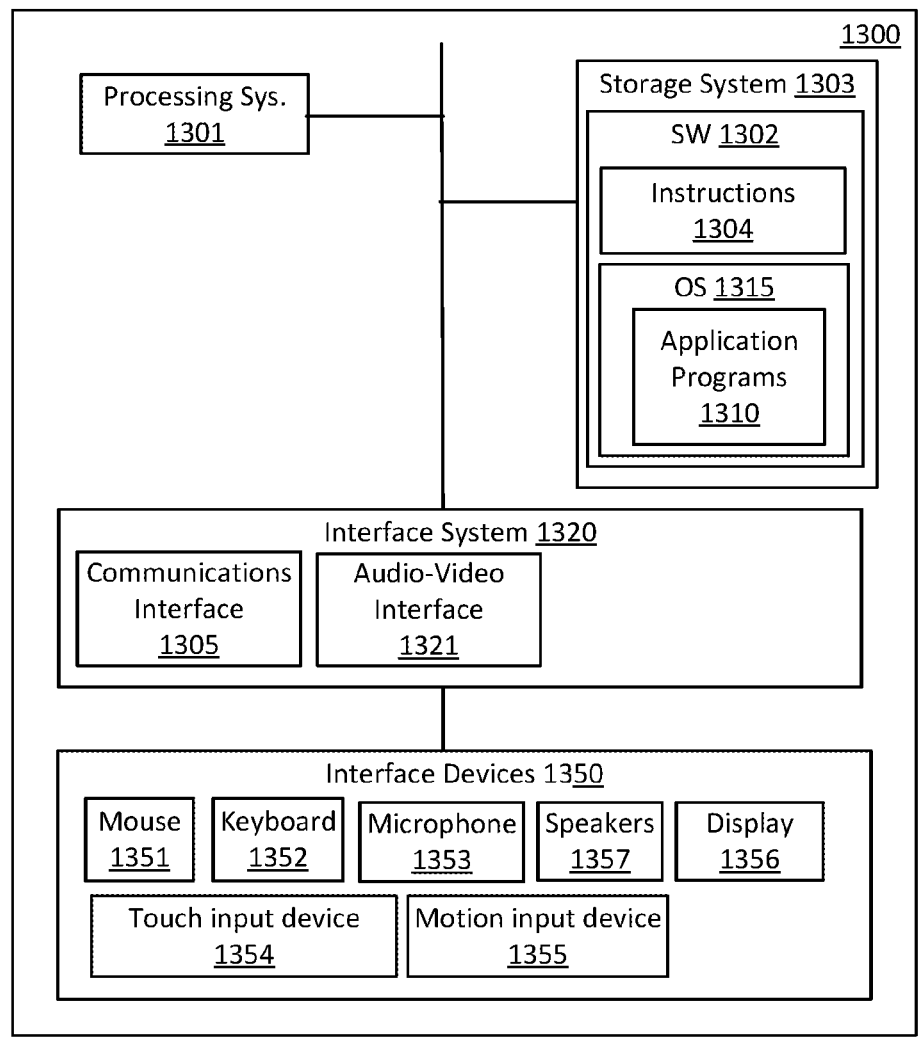
FIG. 13 shows a block diagram illustrating components of a computing device or system used in some embodiments of techniques, systems, and apparatuses for facilitating sensor-based media display management.

Media display client system 120A is an example of a computing device or system having certain components as described in regard to FIG. 13. System 120A includes system components such as computer-readable storage media 101, on which program instructions for a media session component 102A are stored, and processing system 103, which executes the program instructions 102A, transforming the general-purpose computing device into a specific media display client system 120A for displaying media packages and obtaining media session sensor data.

Example media display client system 120A includes a GPS component 104. GPS component 104 may be utilized to access a GPS service in order to obtain location, time, speed, heading, and distance data about the mobile vehicle that the media display client system 120A is affixed or installed upon. Processes employing data from a GPS component 104 are described in relation to FIGS. 7A-7D.

Media display client system 120A includes one or more audiovisual display(s) 107 affixed to an apparatus affixed to the body of the mobile vehicle 99. Audiovisual display(s) 107 are operable to render/display digital media storages, files, and streams as images and/or video. In some embodiments, audiovisual display units also include speakers for rendering standalone audio media and/or the audio track of digital video media formats. Examples of audiovisual display(s) 107 include CRTs, LCD and LED displays and their various subtypes, instantiated in devices such as computer monitors/displays, televisions, touchscreen displays, tablets, etc. An audiovisual display 107 can be comprised of multiple, separate physical components, such as when the visual display component and speaker components for producing audible sounds are separated physically but connected by an interface to a common computing system. In some embodiments, an audiovisual display 107 can be comprised of a semitransparent surface on which an image is projected from an image-producing device (e.g., a portable projection device) behind it.

The one or more audiovisual display(s) 107 may be affixed to the apparatus in a rear-facing aspect (i.e., facing outward from the back of the mobile vehicle, such that a driver or pedestrian behind the mobile vehicle can see the rear-facing audiovisual display). One or more audiovisual display(s) 107 may be mounted within the apparatus in a side-facing aspect (i.e., facing outward from the side of the mobile vehicle, such that a driver or pedestrian on the left or right side of the mobile vehicle can see the side-facing audiovisual display, as in, e.g., FIG. 6C). One or more audiovisual display(s) 107 may be affixed to the apparatus in a front-facing aspect (i.e., facing outward from the front of the mobile vehicle, such that a driver or pedestrian in front of the mobile vehicle can see the front-facing audiovisual display, as in, e.g., FIG. 6B). One or more audiovisual display(s) 107 may be affixed to the apparatus in an upward-facing aspect (e.g., to allow viewers in buildings with higher floors to see the media) and/or a downward-facing aspect (e.g., to allow viewers situated lower than a taller mobile vehicle such as a truck to see the media). Any combination of rear-facing, side-facing, front-facing, and/or upwardfacing and downward-facing audiovisual displays are possible, so long as at least one audiovisual display 107 is present. One or more of the audiovisual display(s) 107 may be tilted to intermediate angles, e.g., downward facing at a 45-degree angle from the horizontal.

In certain embodiments, the audiovisual display(s) 107 can be housed outside the other media display client system components yet remain interfaced to the components via audio-video interface components, such as wired connectors, as described with respect to interface system 110. In some embodiments, audiovisual display(s) 107 are physically integrated with other computing system components as, for example, when an audiovisual display device 107 is part of a tablet device.

Object sensor component array 106 includes one or more devices or components capable of detecting the presence of an object of interest in a particular proximity to the mobile vehicle 99. An object of interest includes other vehicles conveying human observers (e.g., passenger vehicles, public transport, trucks, vans, motorcycles), other forms of transportation conveying human observers (e.g., cyclists, skateboards, scooters), and human observers that are pedestrians. Data collected about an object of interest can include a data-defined signature that indicates the type of object (e.g., vehicle, vehicle type, human being), the object's heading, the object's speed, and the distance of the object of interest from the object sensor. This data may be used, for example, to perform audience detection/estimation as well as to record the duration the object remains within the optimal viewing distance from the object sensor, as described further in regard to FIGS. 7A-7B. The proximity of an object of interest as an audience member may vary in accordance with dynamic factors relating to the characteristics of a specific instance of a media display client system, including, for example, the type and capabilities of object sensor, the size, clarity, or brightness of the audiovisual display unit(s), and local viewing conditions (e.g., viewing conditions affected by weather).

Object sensors can take a variety of forms, including RADAR, LIDAR, and camera components.

LIDAR object sensor(s) can be used to very accurately determine the distance of an object from the LIDAR sensor. In some cases, object type analysis can be performed using LIDAR data. Different types of LIDAR include, for example, mechanical lidar and solid state lidar.

RADAR-type object sensor(s) can be used to determine the speed, distance, and/or direction of objects near the mobile vehicle 99 conveying the media display client system. In some embodiments, RADAR data may be analyzed to determine the shape of objects in order to classify them by object type.

Camera components include one or more cameras capable of capturing an image or video from an outbound viewpoint from the apparatus affixed to the mobile vehicle 99 on which the apparatus is housed. In some embodiments, the camera components include at least one camera operative to capture a still image or video from an outbound viewpoint of at least one of the audiovisual display unit(s) 107 (see, for example, the outbound viewpoint of apparatus 200 shown in FIG. 4).

Figure 7A:
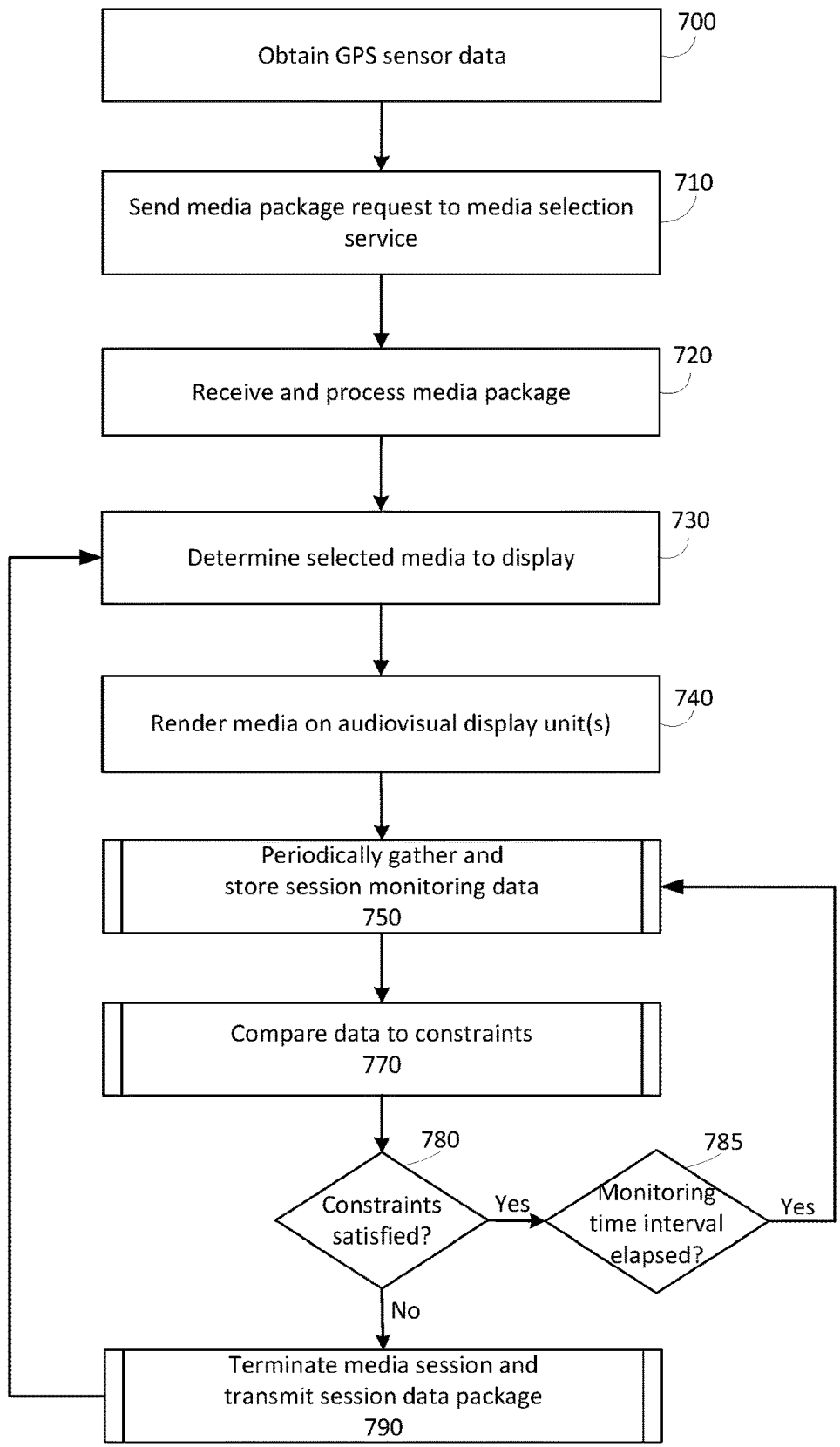
FIGS. 7A-7D show example process flows that may be executed in some embodiments of a media display client system.
Figure 7B:
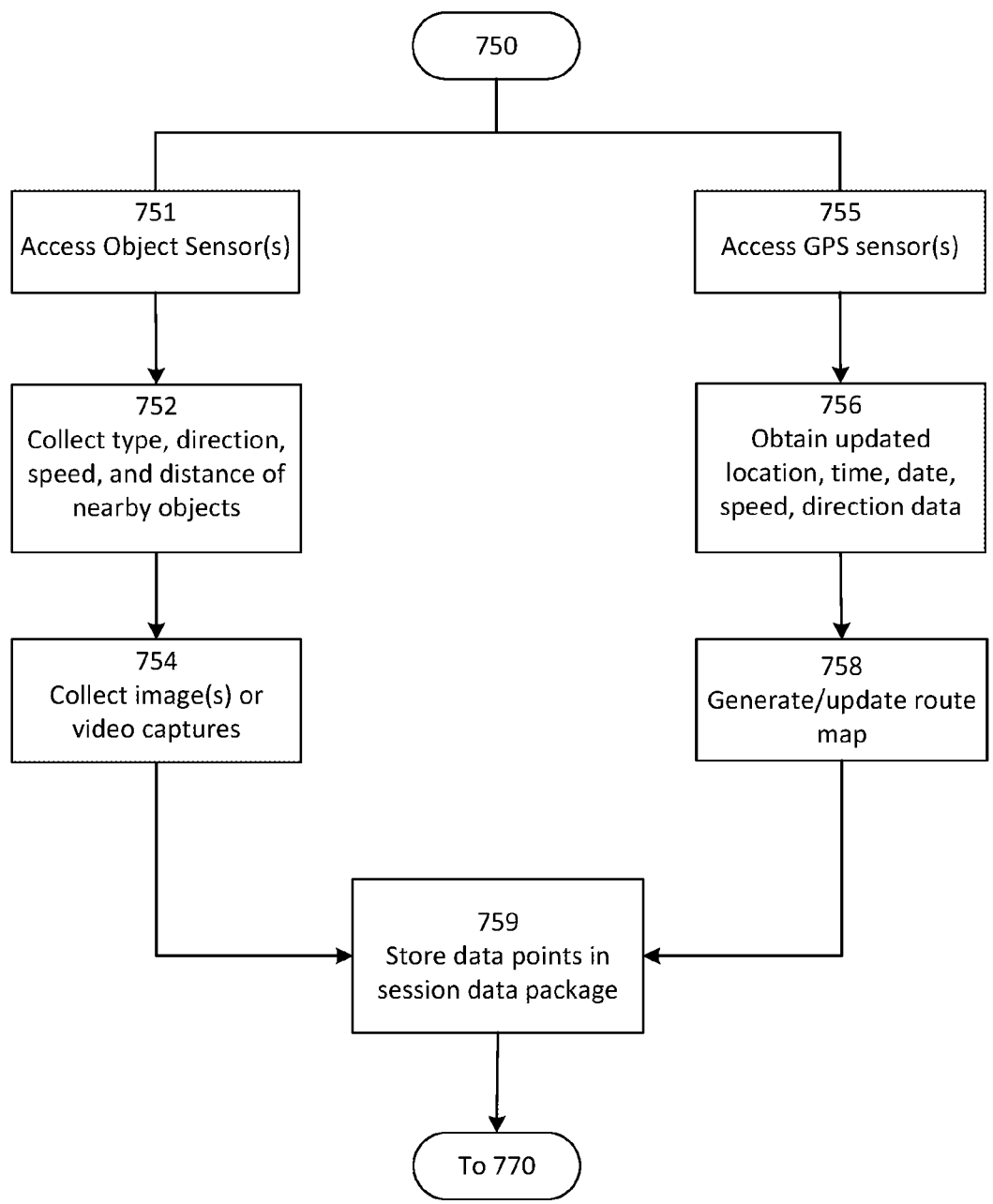

Camera components implement the visual imagery datagathering aspect for performing audience detection, e.g., detection of the existence of human observers of the media via the periodic capturing of images and/or video, the process of which capturing is described with regard to FIG. 7A-7B. In some embodiments, images and/or video captures from camera components are used to classify objects into object types that are relevant to audience estimation. For example, images and video captures may be analyzed to perform face identification and eye gaze tracking within the image or videos, indicating the presence of an audience member within viewing range of the selected media.

In certain embodiments, camera components implement the visual imagery data-gathering aspect for performing obstruction detection, e.g., detection of the existence of obstructions to the audiovisual displays, such as other vehicles, trees, roadway structures, signs, debris, or sun glare, that may impede the viewing of the media being displayed on the audiovisual display(s) by human observers in one or more viewing angle relations to the audiovisual display(s) 107.

The object sensor component array 106 can be made up of many combinations of forms of object sensor, for example, RADAR only, LIDAR only, camera components only, RADAR and LIDAR, RADAR and camera components, LIDAR and camera components, and RADAR, LIDAR and camera components (i.e., all three types). The object sensor components forming the object sensor component array 106, including those of the same object sensor type (e.g., camera, LIDAR, RADAR), may also be part of various systems; i.e., certain object sensor components may be part of the media display client system, while other object sensor components are leveraged from the vehicle system (see, e.g., FIGS. 1A-1C).

In examples and embodiments, object sensors comprising the object sensor component array 106 are located variously, including on the mobile vehicle 99 (e.g., webcams and similar devices, LIDAR units, and RADAR units mounted on the roof top, sides, hood, trunk enclosure, truck bed enclosure (or "topper") roof, sides, or back, pickup tailgate or latch, or other external surface; within the external frame of the mobile vehicle 99, such as inside the front grill, in the rear frame, as for a backup camera, or other frame location) and within the mobile vehicle 99 (e.g., placed in the rear or front window dashboard area, mounted to a side window, within the bed of a "pickup truck," or tailgate or latch of the pickup truck bed). Additional examples and embodiments locate one or more object sensors affixed to or within the media display client apparatus itself, such as mounted on the external top or sides of the media display client apparatus, or within the protective enclosure of the media display client apparatus. In some examples (see, e.g., FIGS. 1B-1C), one or more object sensors in the object sensor component array 106 are installed on the mobile vehicle 99 and are utilized by interacting through an interface system 110 with software components installed the mobile vehicle system (e.g., 100B and 100C from FIGS. 1B and 1C, respectively).

In some embodiments, one or more tablets (such as an iPad® or Android® device) may be utilized as audiovisual display unit(s) 107. In such embodiments, certain camera components may already be present on the standard tablet, pointing outward from the tablet display panel. A plurality of tablets might be synchronized or paired with one another to show the same media simultaneously and capture different outbound viewpoints from each of the audiovisual displays 107. The activity of the plurality of tablets might be coordinated by a tablet acting as the media display client system 120A that resides, for example, inside the mobile vehicle. Alternatively, one of the tablets (e.g., a "master tablet") may act as an audiovisual display 107, a camera component in the object sensor component array 106, and as the media display client system (e.g., 120, 120A-C) which coordinates the display of media on the other tablets acting as audiovisual displays. It should be noted that any combination of object sensor component locations described above, e.g., on the vehicle, in the vehicle, and on or inside the media display client apparatus, can comprise an object sensor component array. Further, camera components may be capable of more than one outbound viewpoint from a single mounting point.

Some embodiments of a media display client system may include a graphics processing system 108. A graphics processing system 108 may include, for example, a graphics processing unit (GPU) and the bus architecture (e.g., VESA, PCI) and or hardware driver software required to integrate the GPU into a computing system with a processing system and other components. The graphics processing system 108 may be used to process media for rendering on the audiovisual display unit(s) 107, as well as (in some cases) to interpret images and video captures from the camera components.

Embodiments also have an interface system 110, which in some embodiments may include several subtypes, such as a communications interface, an audio-video interface, and a power interface, as well as other types of serial, parallel, and specialized interfaces supporting various components.

A communications interface may be used to provide communications between systems, for example over a wired or wireless network 140 (e.g., Ethernet, WiFi, a personal area network, a wired area network, an intranet, the Internet, Bluetooth, etc.). The communications interface may be composed of several components, such as networking cards or modules, wiring and connectors of various types, antennae, and the like. Synchronized tablets may communicate over a wireless network such as via Bluetooth, Wi-Fi, or cellular. Further information about communications interfaces may be found in regard to FIG. 13.

An audio-video interface may be used to connect audiovisual display unit(s) 107 to the media display client system components, e.g., to the graphics processing system 108. In some embodiments, the audio-video interface may include connectors and wiring of a standard interface type, such as HDMI, VGA or SVGA, DisplayPort, and DVI, for connecting audiovisual display units (e.g., monitors) to GPU components. In some embodiments (e.g., those represented in FIGS. 1B and 1C), the audio-video interface may be of a more specialized type for connecting audiovisual display unit(s) to the vehicle system (e.g., 100B or 100C) of the mobile vehicle 99, e.g., via a special or custom interface port.

Other components of the media display client system, such as object sensor components and the GPS, may be connected via other types of interfaces present in the interface system 110). These types of interface can adhere to categories such as parallel or serial (e.g., using interface standards such as USB, Firewire, etc.). In some embodiments (e.g., those represented in FIGS. 1B and 1C), the other interfaces may be of a more specialized type for connecting media display client system components together with components that are part of the vehicle system (e.g., 100B or 100C) of the mobile vehicle 99. Object sensor components (including camera components), GPS components, and audiovisual display units can be physically separate, but connected via the interface system, and still be part of same "system".

Some embodiments of media display client system 120 (e.g., 120A, 120B, and 120C) connect to vehicle system 100 to provision one or more capabilities. For example, media display client system 120 in some embodiments have direct-current (DC) power interfaces (e.g., wiring harnesses) connected to the DC power bus of the vehicle system 100 in order to provide power to one or more system components. Similarly, some embodiments may also have an AC-to-DC converter device that transforms DC power from the DC power bus of the vehicle system 100 to AC power that can be used for standard computing system components. Power interfaces, when present, are subtypes of the interface system 110.

Some embodiments of media display client system 120 may optionally have their own power system, such as a battery cell like those found in a UPS (uninterruptable power supply). These embodiments may use power interfaces (including DC interfaces and AC-to-DC converter devices) to recharge the battery system in the UPS. In some embodiments, power for system components or power for recharging the UPS battery can be provided to the system by a solar panel arrangement affixed to the outside of the apparatus and the associated solar panel to AC or DC power interface components.

Network 140, connectivity to which is provided by the interface system 110, may be accessed by the media display client system 120A to interact with media management system/service 160, and client interface 130, as described in relation to FIG. 1.

Certain types of vehicle systems may have components that the mobile vehicle uses to perform autonomous driving, vehicle-assisted driving, or that are used in driver warning systems (e.g., pedestrian detection, backup camera warnings, side mirror object detection, automatic braking systems). Vehicle systems may also have GPS components to provide navigation functions.

FIG. 1B shows an example embodiment of a systems environment in which media display client system 120B leverages certain components that are part of the vehicle system 100B of the mobile vehicle 99. In FIG. 1B, the media display client system 120B utilizes a GPS component 104 that is part of the vehicle system 100B. Object sensors in the object sensor component array 106 of the vehicle system 100B are also utilized in this example.

So that the vehicle system components may be leveraged, connectivity between the media display client system 120B and the vehicle system 100B are provided by a paired interface system 110, present on both 120B and 100B. Element 141 is indicative of the local pairing connection between the systems 120B and 100B. Connection 141 may be implemented over a network (e.g., wired, wireless, Bluetooth) using a communications interface as described previously. In some embodiments, the other interfaces may be of a more specialized type for connecting media display client system 120B components together with components (e.g., 104, 106) that are part of the vehicle system 100B of the mobile vehicle 99.

Specialized program instructions 102B on the computer readable storage media 101 of the media display client system 120B, when executed by processing system 103, perform these specialized operations for accessing and instructing vehicle system 100B components. In addition to these specialized program instructions, program instructions may also include those described in regard to various process flows of system 120B (e.g., in FIGS. 1, 1A, and 7A-7D) and/or those for controlling system components such as audiovisual display unit(s) 107, in conjunction with graphics processing system 108.

Network 140, connectivity to which is provided by the interface system 110, may be accessed by the media display client system 120B to interact with media management system/service 160, and client interface 130, as described in relation to FIG. 1.

In addition to object sensor and GPS components as described in FIG. 1B, certain types of vehicle systems have components that the mobile vehicle 99 uses for other functions, such as computing system components for processing object sensor data for vehicle control systems, providing user interfaces to drivers, and connecting with video display screens inside the vehicle (e.g., for passenger entertainments). FIG. 1C shows an example embodiment of a systems environment in which a simplified media display client apparatus 120C leverages several components that are part of the vehicle system 100C of the mobile vehicle 99.

In FIG. 1C, the media display client apparatus 120C, such as the apparatus depicted in FIGS. 2-6, has audiovisual display unit(s) 107, and an interface system 110. The apparatus 120C utilizes a GPS component 104 that is part of the vehicle system 100C. Object sensors in the object sensor component array 106 of the vehicle system 100C are also utilized in this example. In addition, the graphics processing system 108, processing system 103, and computer-readable storage media 101 of the vehicle system 100C are leveraged by the media display client apparatus 120C.

Some mobile vehicle systems have the capability for users or manufacturers to upload custom programs onto the vehicle systems. For example, "apps" can, in some mobile vehicles, be installed via the vehicle's user interface panel, which may run a variation of a common operating system such as ANDROID. In this manner, specialized program instructions 102C may be installed on the computer readable storage media 101 of the vehicle system 100C. When executed by processing system 103 it may perform these specialized operations for accessing and instructing vehicle system 100C components in accordance with processes herein. In addition to these specialized program instructions, program instructions may also include those described in regard to various process flows described herein (e.g., in FIGS. 1, 1A, and 7A-7D) and/or those for controlling system components such as camera components and audiovisual display unit(s) 107 of the media display client apparatus 120C that are outside the vehicle system 100C.

Connectivity between components of the media display client apparatus 120C and the vehicle system 100C so that the vehicle system components may be leveraged are provided by a paired interface system 110, present on both 120C and 100C. Element 141 is indicative of the local pairing connection between the systems 120C and 100C. Connection 141 may be implemented over a network (e.g., wired, wireless, Bluetooth) using a communications interface as described previously. In some embodiments, the other interfaces may be of a more specialized type for connecting media display client apparatus 120C components (e.g., 107) together with the vehicle system 100C of the mobile vehicle 99.

Network 140, connectivity to which is provided by the interface system 110, may be accessed by the vehicle system 100C to interact with media management system/service 160, and client interface 130, as described in relation to FIG. 1. User interface features may be presented on the mobile vehicle's 99 user interface panel, which serves as a client interface 130, via an app to show the driver operator various metrics and provide control and configuration options.

In some embodiments of media display client system 120, including any example configuration in FIGS. 1A-1C, all or part of the processing system (e.g., 103), computer-readable storage media 101, and program instructions for a media session component (e.g., 102A, 102B, and 102C) may supported by a cloud computing arrangement, for example by being hosted by the media management system/service 160. In such embodiments, a remote computing system (e.g., consisting of a multiplicity of coordinating virtual cloud computing systems) may use their processing systems to execute certain program instructions, such as those implementing all or part of the media display client system process flows described in FIGS. 7A-7D. Connectivity to these cloud computing systems, which may be instances of computing systems as described in FIG. 13, may be provided by using the interface system 110 to connect with the media management system/service 160 over network 140.

FIGS. 2-6G show example embodiments of components, configurations, and placement of a media display client apparatus for housing a media display client system and mounting it on a mobile vehicle.

Figure 2:
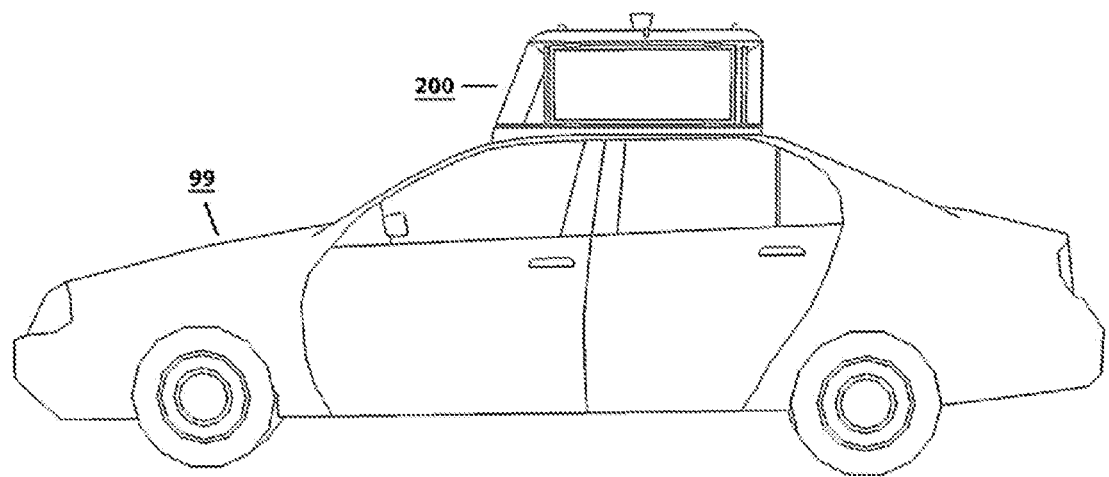
FIG. 2 shows an example view of a media display client apparatus mounted on a mobile vehicle.

FIG. 2 shows an example view of a media display client apparatus mounted on a mobile vehicle. In FIG. 2, media display client apparatus 200 is mounted to the roof of mobile vehicle 99. It should be noted that other top-surface mounting points on a mobile vehicle are possible, e.g., on the trunk of a passenger car, the top of a delivery truck, and the open bed of a pickup truck or top of a pickup "topper"-FIG. 2 shows only one possible mounting point of media display client apparatus 200 in which the mounting hardware is bolts through the vehicle roof. Mounting of apparatus 200 on other surfaces is described in respect to subsequent figures.

Figure 3:
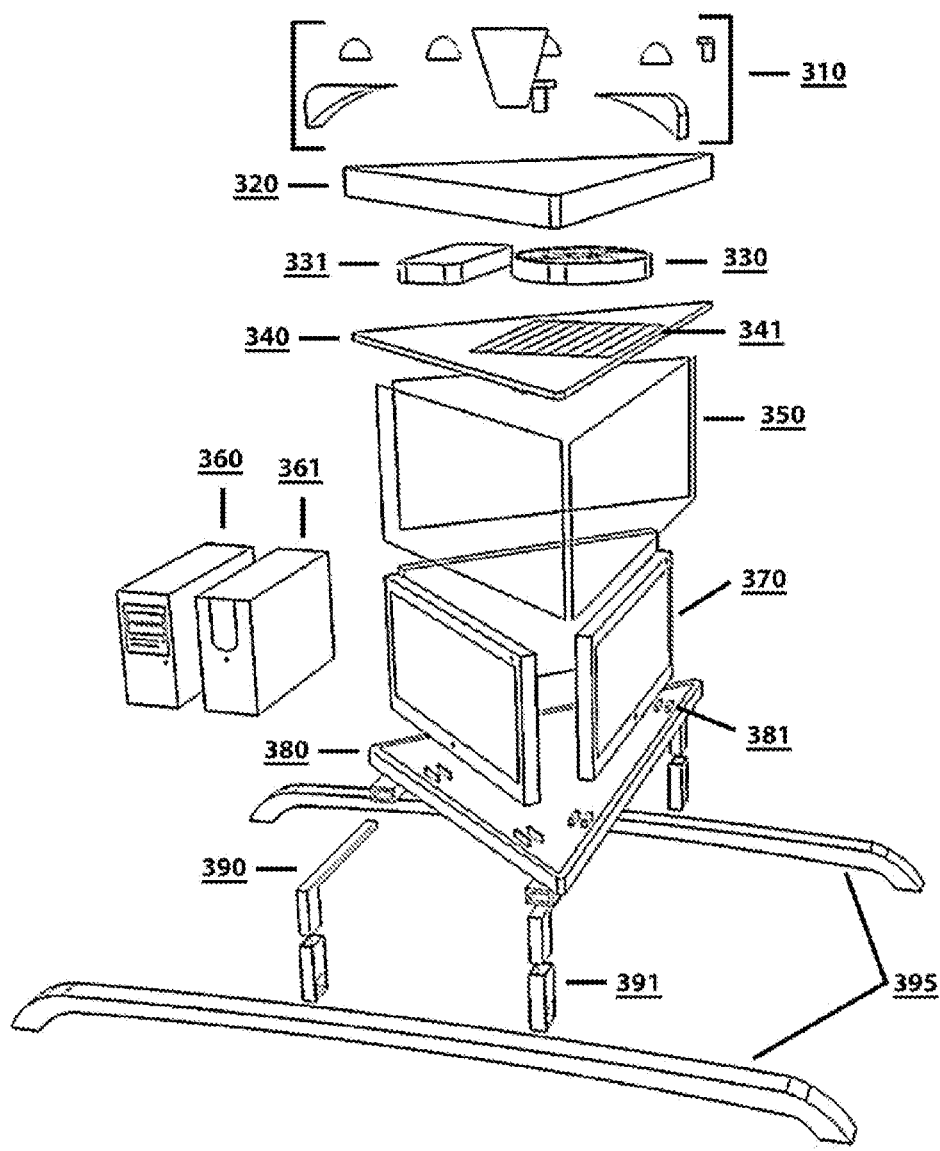
FIG. 3 shows an example exploded view of an embodiment of a three-sided media display client apparatus.

FIG. 3 shows an example exploded view of an embodiment of a three-sided media display client apparatus. In FIG. 3, a protective enclosure is formed by the assembly and attachment of a triangular roof piece 320, to three transparent sides/panels 350 positioned vertically or nearly vertically, to a base platform 380. It should be noted that, while the triangular protective enclosure formed by the triangular roof piece 320, matching triangular base 380, and three transparent panels/sides 350 constitutes one possible shape of a media display client apparatus, other shapes are possible—e.g., foursided protective enclosures using a rectangular-shaped roof and base and four panels/sides; pentagonal or hexagonal protective enclosures with five- or six-sided roofs and bases and five or six panels/sides, respectively; oval or elliptical-shaped protective enclosures using oval-shaped roofs and bases and two curved sides; and protective enclosures with slanted or curved sides.

The base 380 and roof 320 can be made from a variety of materials, including high durability plastic, UV-resistant plastic, and metal alloys. Transparent sides/panels 350, for example, can be composed of shatter-resistant glass (e.g., tempered) or high-durability transparent plastic, such as Acrylic/PMMA or clear polycarbonate. Some embodiments may have one or more non-transparent sides made of other durable but non-transparent plastics. It should be noted that any panel/side in any embodiment may be only partially transparent, as for instance when part of surface of the side is transparent and the remainder of the surface of the side is opaque.

Housed inside the protective enclosure formed by base 380, roof 320, and sides 350 are audiovisual display unit(s) 370. Audiovisual display unit(s) 370 are standard panel displays (e.g., LCD or LED) or tablet computers. Other variants (not shown) support a curved or bendable audiovisual display panel. The audiovisual display units face outward so that the transparent sides 350 allow them to be visible to persons looking at the media display client apparatus. Bracing pins or tabs 381 on the base 380 are shown, for illustrative purposes, for holding the audiovisual display units 370 vertical (or nearly vertical) and stable within the protective enclosure; these are not intended to be limiting, as there are many ways of bracing or affixing the audiovisual display units 370 within the apparatus. Similar bracing pins or mounts (not shown) may be provided in some embodiments to secure other components (e.g., computing system 360, battery cell/UPS 361) that are optionally present within the protective enclosure Many possible options exist for mounting the apparatus on a mobile vehicle 99 and the depicted example is not intended to be limiting. The example media display client apparatus shown in FIG. 3 includes mounting hardware (e.g., 390, 391) attachable to the base 380 for affixing the apparatus to the roof rack rails 395 already installed mobile vehicle 99. In FIG. 3, a two-part sliding unit 390 is shown, where one hollow component is attached to the base 380 (e.g., using bolts or other fasteners) and the other angular component is inserted into the hollow component attached to the base 380. The vertical part of the angular end of 390 is then paired with a component 391 that attaches vertically to the roof rack rails 395.

Other types of mounting hardware include screws or bolts that affix the apparatus to the mobile vehicle surface (e.g., FIG. 2). Magnets may also be attached to the underside of the base 380 to magnetically clamp the apparatus to the metallic surface of the mobile vehicle (e.g., FIGS. 6E and 6G).

In certain embodiments, the mounting hardware is operable to adjust the positioning of the apparatus on different possible mounting surfaces of the mobile vehicle. For example, the height of the base platform above the mobile vehicle mounting surface may be adjustable so that object sensors or cameras already on the mobile vehicle (e.g., on the roof of the mobile vehicle) can continue to operate without obstruction. The centering of the base platform on the mobile vehicle may also be adjustable. For instance, centering of the apparatus on the roof of the mobile vehicle is possible using the two-part sliding rail unit 390 paired to movable affixation components 391 that can be variably positioned on roof rack rails 395 depicted in FIG. 3. In some embodiments, the tilt of base platform can be adjusted to accommodate a sloping roof or trunk lid of a mobile vehicle. FIG. 3 shows an example of such mounting hardware in that the vertical part of the angular end of 390 may be paired adjustably with component 391 attaching to the roof rack rails 395.

Other components depicted in FIG. 3 are illustrative of variations available in some (but not all) embodiments. As described elsewhere, object sensor component array 310 may be mounted or affixed to the top of the roof 320 of the media display client apparatus. Camera components (not shown) may also be mounted similarly on top of roof 320.

A cooling unit 330 may be present in some embodiments that is capable of regulating the temperature and/or humidity levels within the protective enclosure. The cooling unit 330 can be of a small or portable size, as depicted in FIG. 3. The cooling unit 330 can, for example, use evaporative cooling technology to cool air by passing the air over a fan with self-contained evaporative cooling pads moistened by water from a reservoir. Cooling units such as these use little power (in some cases they can be powered by USB or even standard-size batteries (e.g., AA size) and are small in size (see, for example, the "WoneNice Portable Small Fan & Mini-air Conditioner, Runs On Batteries Or USB-Gray" sold on Amazon.com, which cools air by approximately 30° F. and runs on AA batteries or powered USB). These examples are of course not intended to be limiting; larger-sized HVAC and refrigeration technologies (e.g., portable A/C units and the types of compressor systems seen in small refrigerators) are also envisioned.

Also depicted in this example embodiment is a battery unit 331 for powering the cooling unit 330. In other embodiments, the cooling unit 330 can attach (e.g., via powered USB or other power interface) to the computing system battery cell 361, computing system 360 (e.g., via powered USB port) or DC power system of the mobile vehicle.

The cooling unit 330 and/or battery unit 331 may be supported by or separated from a divider platform 340 with vent 341 for positioning the cooling unit 330 and battery unit 331 above the compartment containing the audiovisual display units 370 and computing system 360. The vent 341 may allow airflow between the cooling unit 330 and the protective enclosure compartment and provide dust/particulate filtration with the addition of a filter. Vent 341 may allow for hot air to exit the protective enclosure compartment without intaking any outside elements such as water that can damage the components inside.

In some embodiments, including the example in FIG. 3, a computing system 360 may be housed within the protective enclosure, for example in the empty space created between the panels of the audiovisual display units 370 or within the roof 320 or base platform 380. The computing system 360 includes, for example, certain components of a computing device as described in FIG. 13 (e.g., a processing system, computer-readable storage media, an interface system, a GPS component). Computing system 360 is capable of executing the program instructions of a media display client system (e.g., 120) as described in regard to FIGS. 1-1C, 7A-C, and elsewhere herein. The computing system 360 need not be a desktop-type device as suggested by FIG. 3; it could be a small, standard-model portable device such as a "Raspberry Pi." If one of the audiovisual display units 370 is the screen of a tablet device, the computing system 360 structure/functions can be serviced by the tablet device. The front-facing cameras of tablet devices used as audiovisual display units 370 may also be part of the object sensor component array.

In some embodiments, as in FIG. 3, a battery cell 361 may be housed within the protective enclosure that is operable to provide power to one or more of the audiovisual display units 370, the computing system 360, or the object sensor component array 310. The battery cell 361 can be, for example, a UPS-type battery cell that is charged continuously by the power system of the mobile vehicle through a power interface as previously described.

Figure 4:
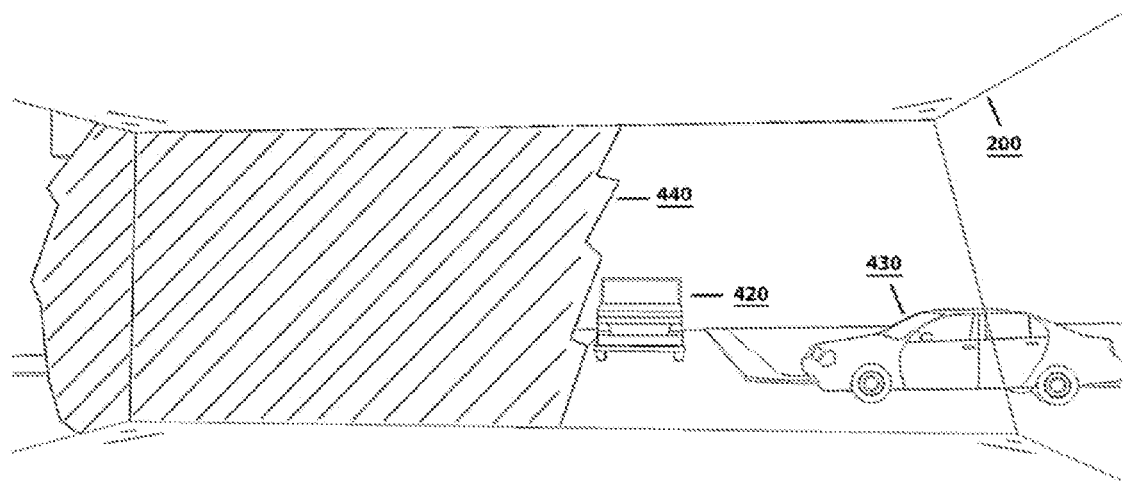
FIG. 4 shows an example outbound viewpoint from the inside of the protective enclosure of a media display client apparatus.

FIG. 4 shows an example outbound viewpoint from the inside of the protective enclosure of a media display client apparatus 200. In the outbound viewpoint, an obstruction 440 (e.g., representing debris such as a newspaper or snow) of the view through the transparent panel is shown as a shaded area. Also depicted are a truck 420 and automobile 430, which may be notable objects relevant to audience estimation.

Figure 5:
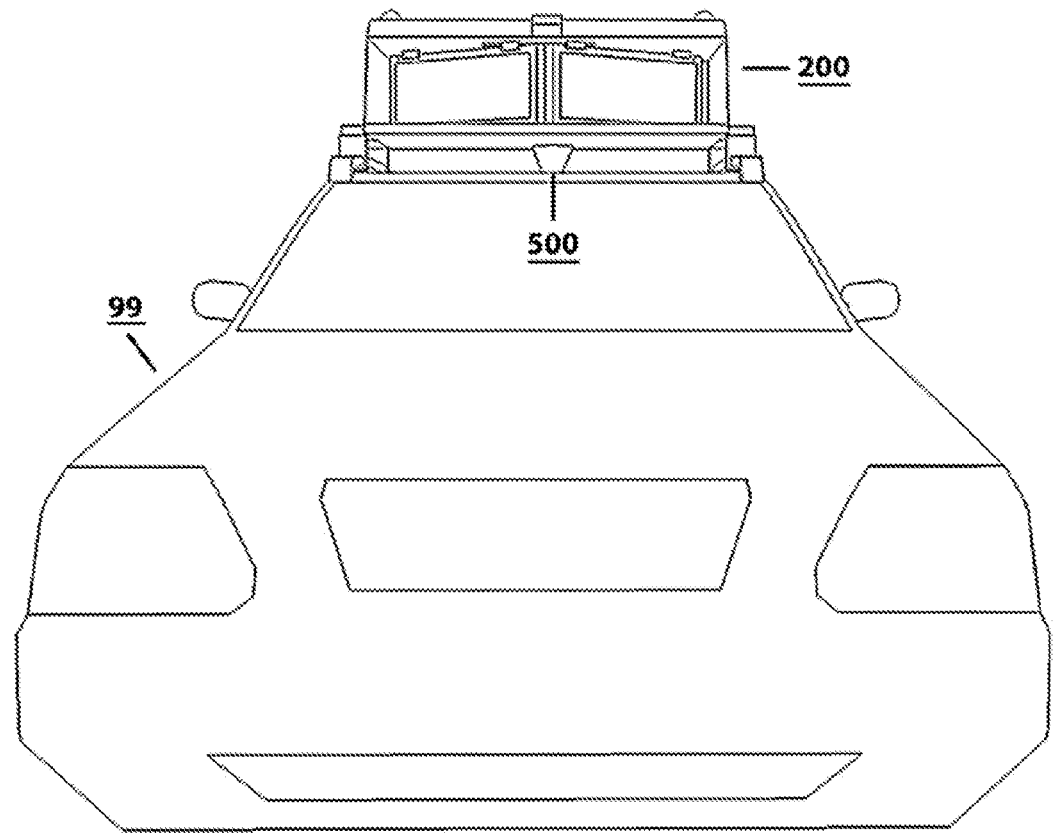
FIG. 5 shows an example view of a media display client apparatus from a perspective facing the front of a mobile vehicle.

FIG. 5 shows an example view of a media display client apparatus from a perspective facing the front of a mobile vehicle. In FIG. 5, media display client apparatus 200 is shown mounted on the roof of mobile vehicle 99 using mounting hardware that is capable of raising the apparatus 200 above the mobile vehicle's built-in object sensor units 500 mounted on the roof. Such a configuration might be used when the mobile vehicle has built-in sensors to support its autonomous driving functions, e.g., as described in FIGS. 1B and 1C.

Figure 6A:
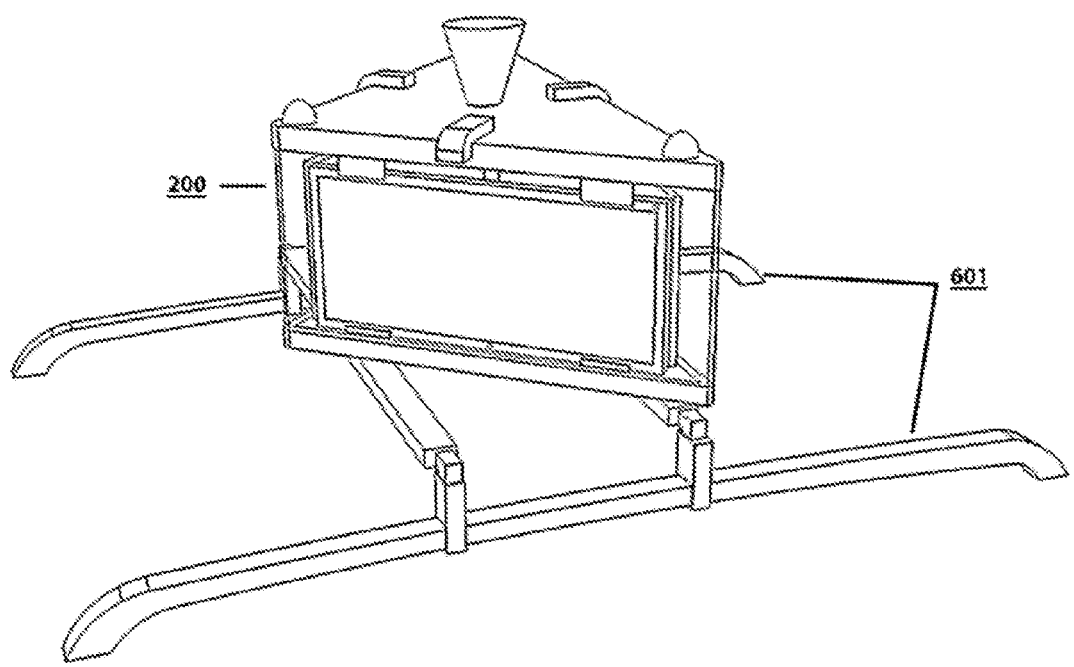
FIGS. 6A-6I show various example perspective views and configurations of a media display client apparatus.

FIG. 6A shows an example unexploded view of the media display client apparatus from FIG. 3. In FIG. 6A, the media display client apparatus 200 is affixed to the roof rack rails 601 that are preinstalled or can be affixed to the roof of the mobile vehicle. Note that the triangular-shaped apparatus 200, with the apex of one side of the triangle pointed toward the front of the mobile vehicle, which can increase its aerodynamic qualities.

Figure 6B:
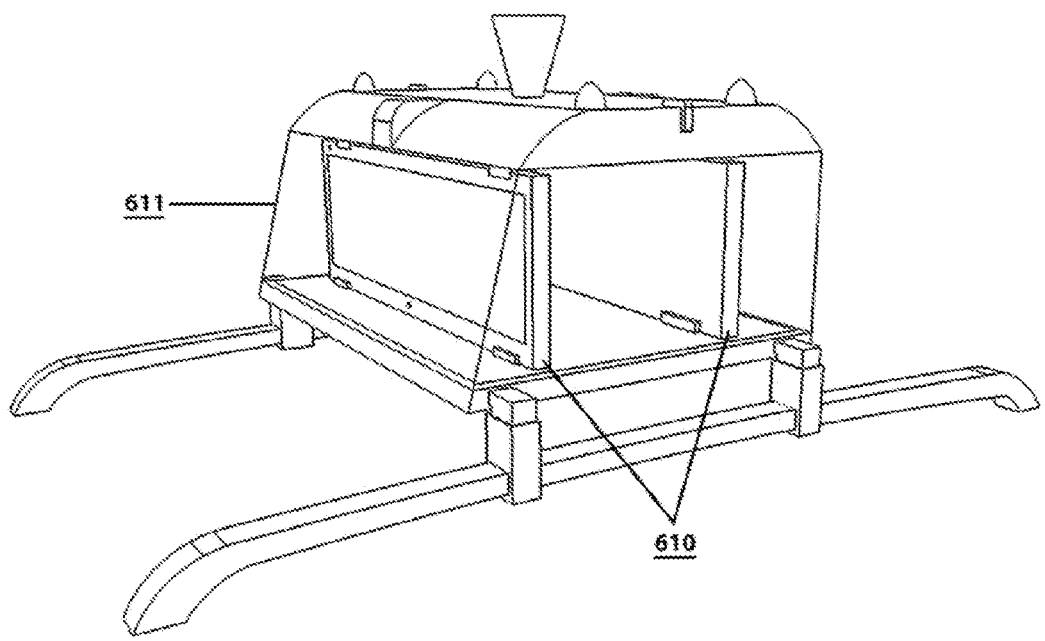

FIG. 6B shows an example view of a media display client apparatus with two audiovisual display units. Two audiovisual display units 610 are positioned such that they are viewable by audiences in front of and behind the mobile vehicle. Transparent front side panel 611 is shown as having a gently sloping backward curve to increase the apparatus' aerodynamic qualities.

Figure 6C:
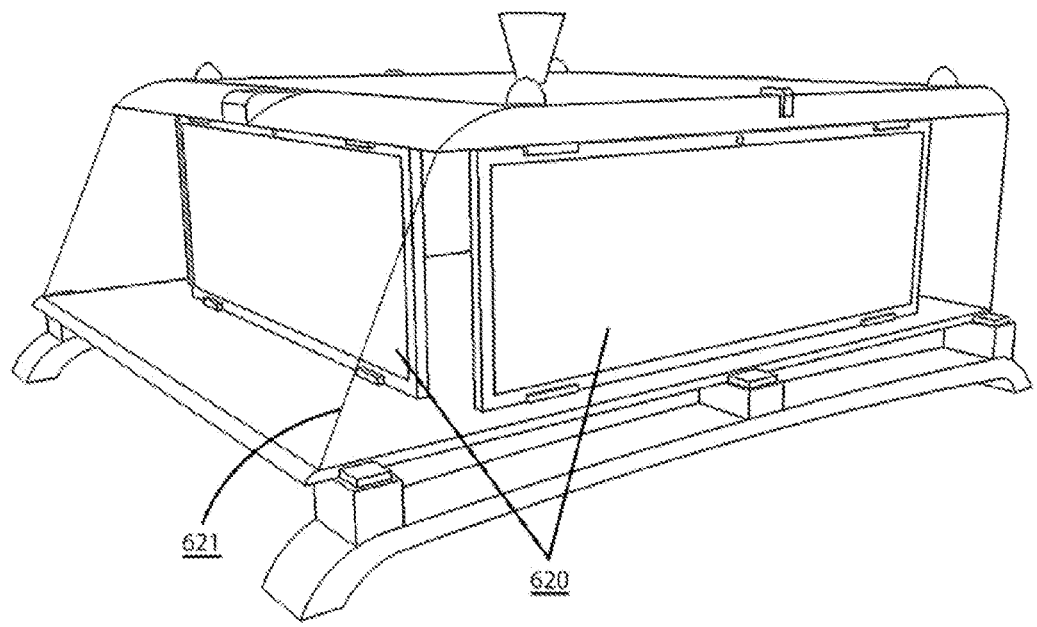

FIG. 6C shows an example view of a media display client apparatus with four audiovisual display units. Audiovisual display units 620 are positioned on all four sides such that they are viewable by audiences in front of, behind, and to the left and right of the mobile vehicle. Transparent front side panel 621 is shown as having a gently sloping backward curve to increase the apparatus' aerodynamic qualities. In this example embodiment, audiovisual display units 620 are placed within the apparatus such that they are recessed beneath the overlapping roof, which can assist in blocking sun glare.

Figure 6D:
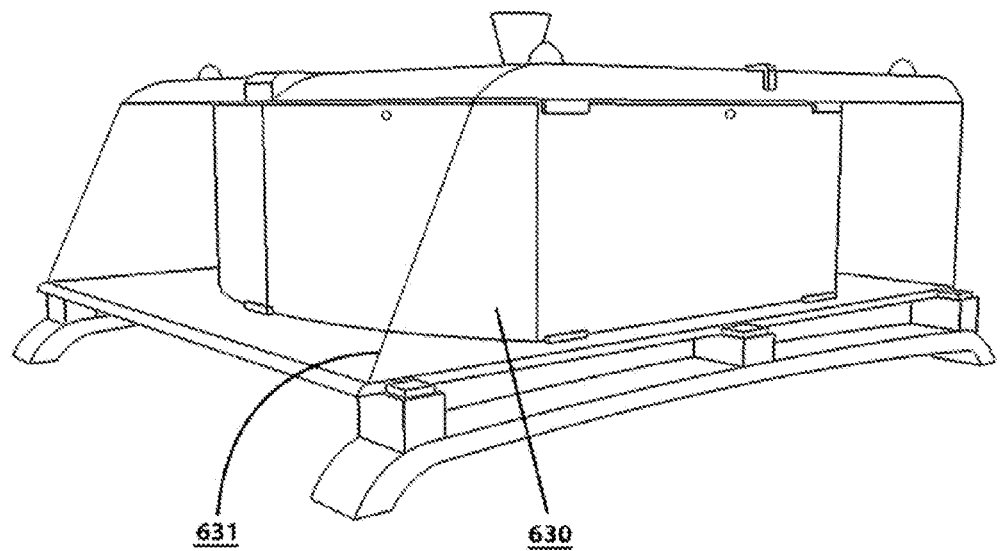

FIG. 6D shows an example view of a media display client apparatus with curved audiovisual display units. Curved audiovisual display units 630 are positioned such that they are viewable by audiences in front of, behind, and to the left and right of the mobile vehicle, allowing for 360-degree viewing by audiences around the apparatus. Transparent front side panel 631 is shown as having a gently sloping backward curve to increase the apparatus' aerodynamic qualities.

Figure 6E:
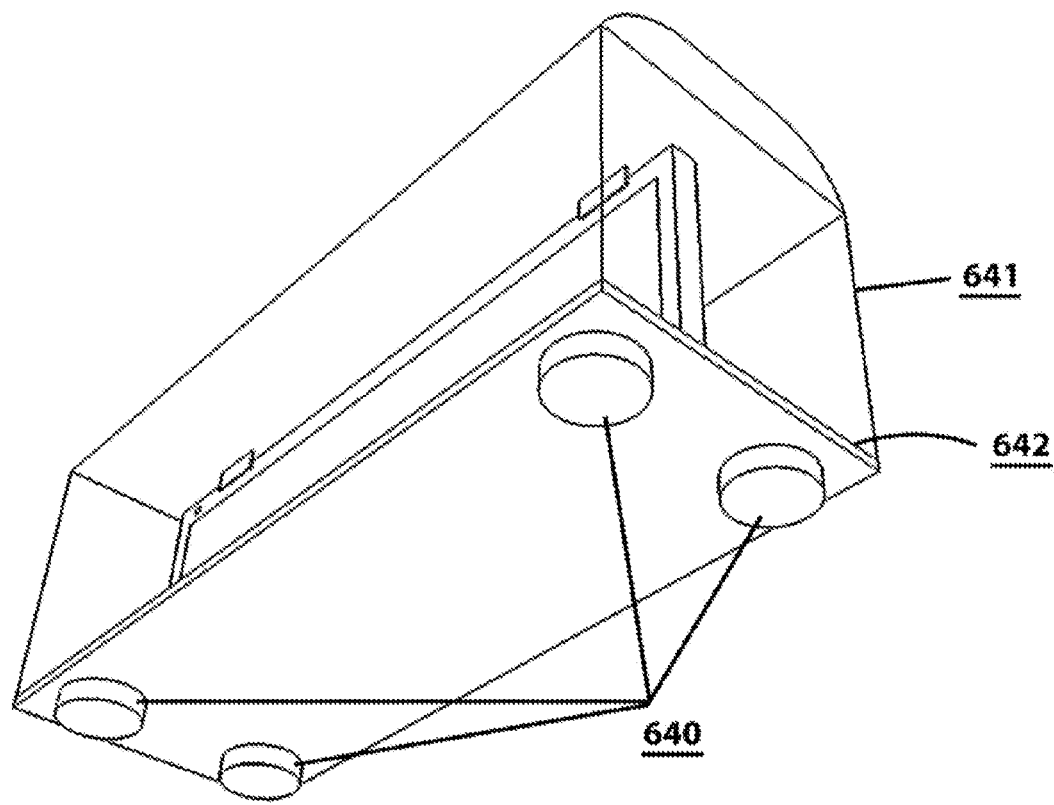

FIG. 6E shows an example view of a media display client apparatus having magnetic mounting hardware. Protective enclosure 641 is atop a base 642. Magnetic pads 640 that can be used to magnetically adhere the apparatus to the mobile vehicle exterior surface have been affixed to the base 642.

Figure 6F:
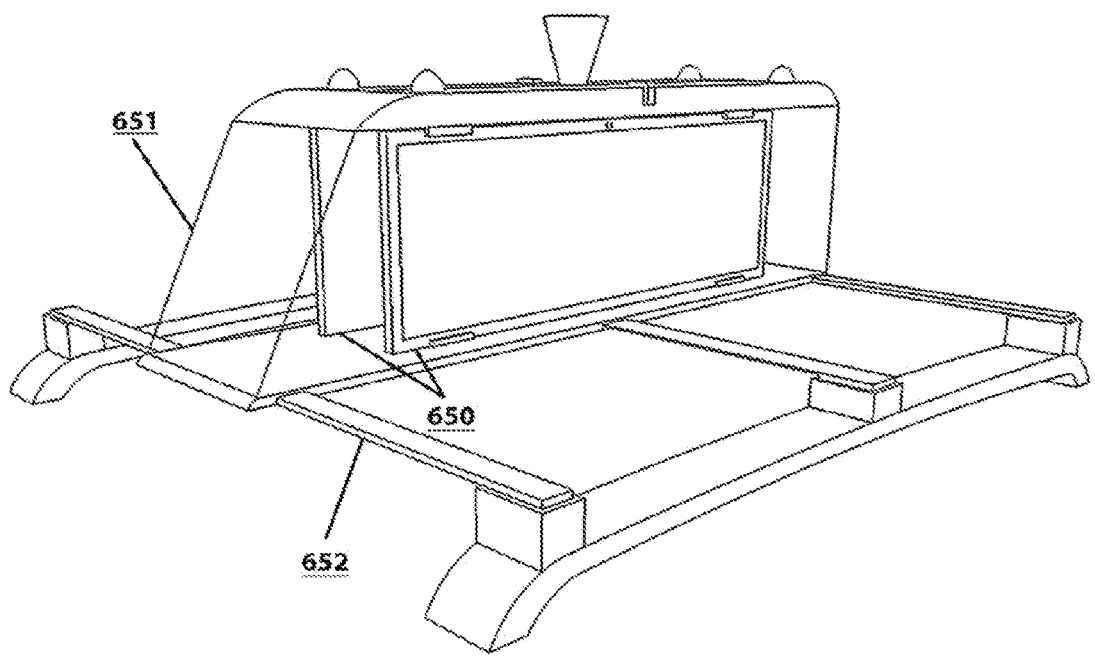

FIG. 6F shows an example view of a media display client apparatus with two audiovisual display units positioned for side viewing. Two audiovisual display units 650 are positioned such that they are viewable to audiences on the left and right side of the mobile vehicle, such as pedestrians on sidewalks or the occupants of vehicles alongside the media display client apparatus. Transparent front side panel 651 is shown as having a gently sloping backward curve to increase the apparatus' aerodynamic qualities. The entire media display client apparatus is affixed to an example rack system 652.

Figure 6G:
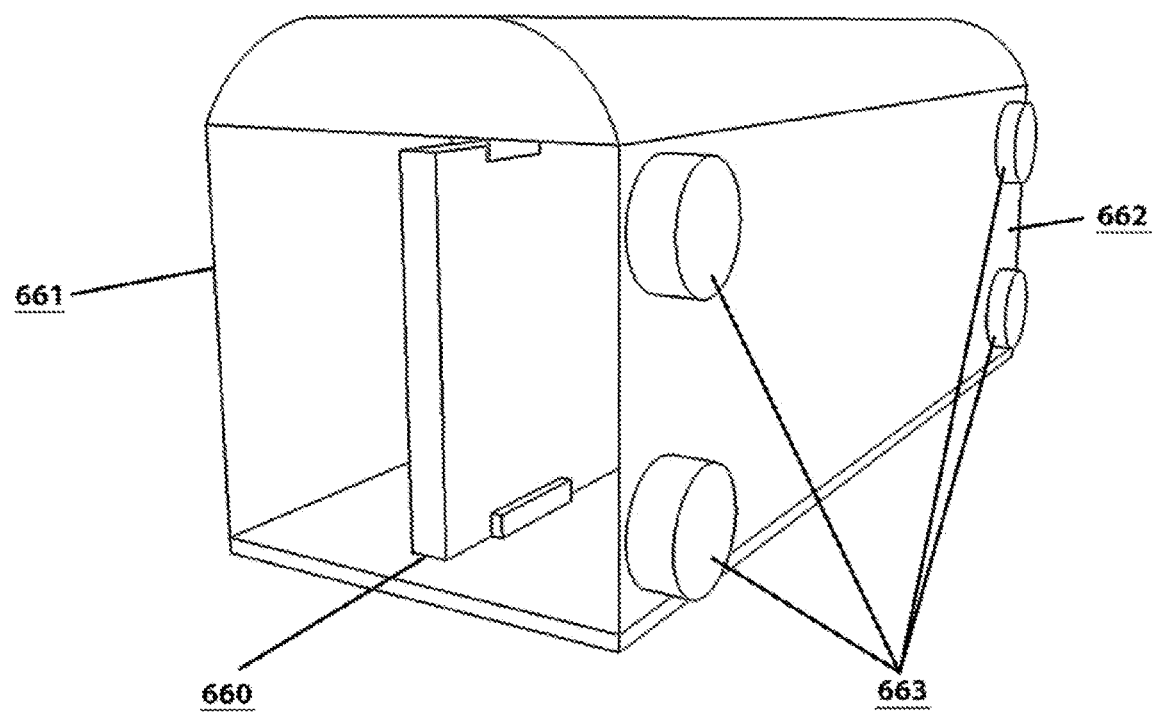
Figure 6H:
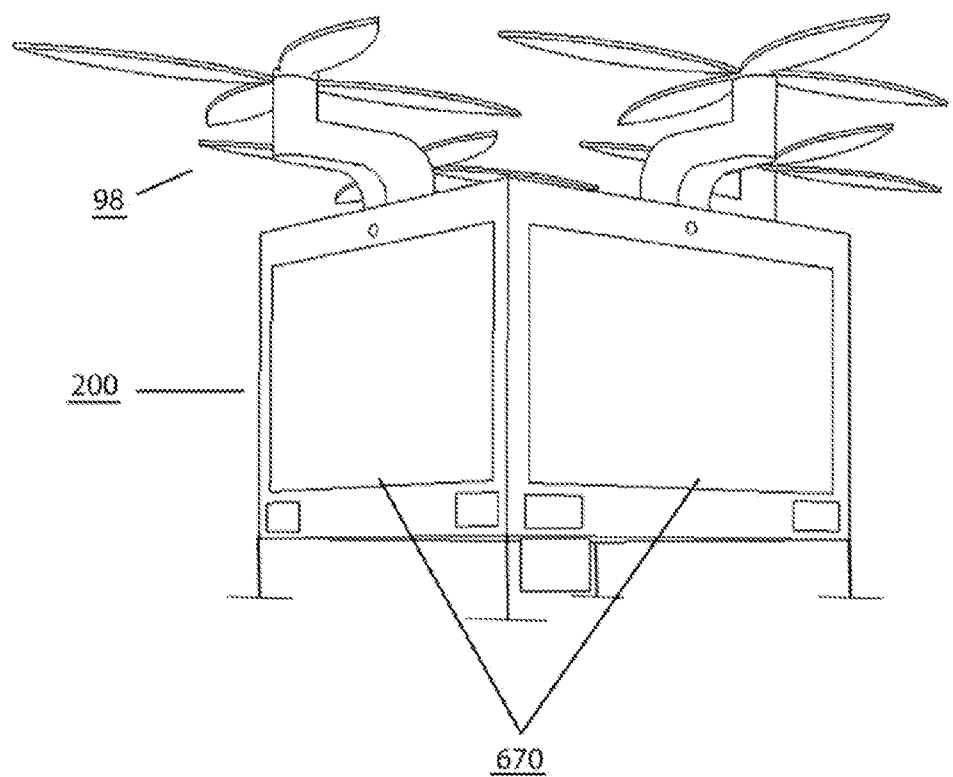
Figure 6I:
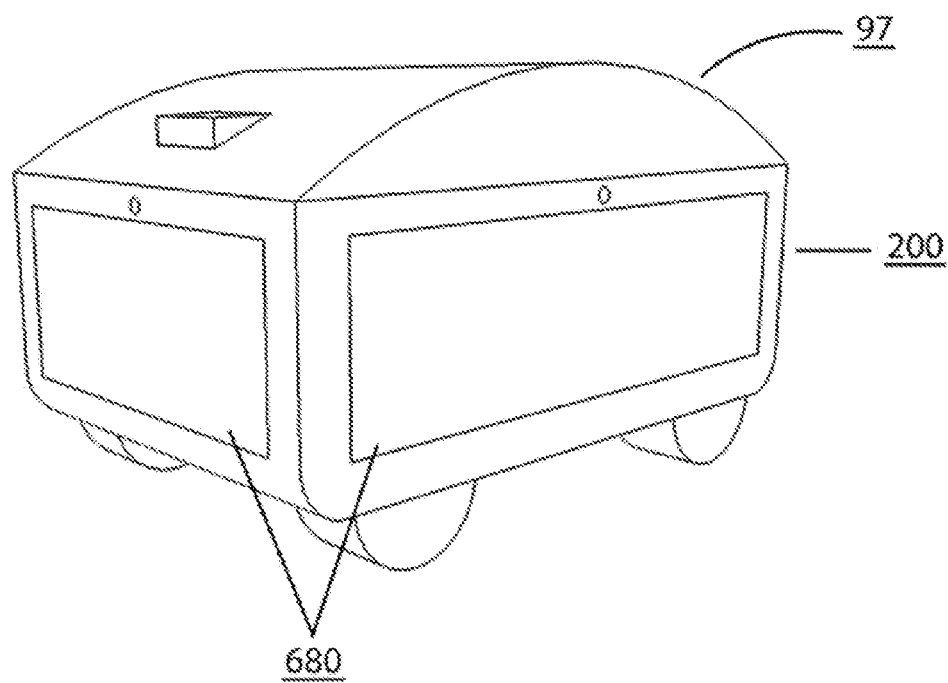

FIG. 6G shows an example view of a media display client apparatus having magnetic mounting hardware on one side of the apparatus. Such a device can be used to mount the apparatus on the back of a semi-truck or rear tailgate of a pickup truck. Protective enclosure 661 is atop a base, enclosing a single audiovisual display unit 660. One side of the apparatus 662, which may be nontransparent and/or made of a similar material as the base, has magnetic pads 663. The magnetic pads 663 can be used to magnetically adhere the apparatus to a mobile vehicle, for example on a vertical or near-vertical side the mobile vehicle's exterior surface, such as on the back of a semi-truck or rear tailgate of a pickup truck.

While FIGS. 1-6G describe a variety of system environment embodiments for a media display client system/apparatus, other configurations with particular hardware morphologies, system relationships, and component placement are also anticipated. Several examples are described below:

E1: A media display client apparatus (as described in FIGS. 2-6G) may house certain components of the media display client system 120 within the protective enclosure. Sensors (e.g., RADAR, LIDAR, and cameras) in any configuration or combination may be housed inside the protective enclosure to be protected from outside elements such as rain or snow. Audiovisual display units are housed inside the protective enclosure.

E2: Example E1 further including a computing system (e.g., processing system, interface system, computer-readable storage media, program instructions) housed within the protective enclosure of the apparatus.

E3: Any Example E1-E2, in which the GPS component is housed within the protective enclosure of the apparatus.

E4: Any Example E1-E3, further including camera components housed within the protective enclosure of the apparatus.

E5: Any Example E1-E4, in which the audiovisual display units are tablet computers.

E6: Any Example based on E5, in which the front camera of each tablet computer serving as an audiovisual display unit is a camera component operative to capture a still image or a video from the outbound viewpoint of the respective audiovisual display unit.

E7: Any Example E1-E4, in which the audiovisual display units are monitors (e.g., LED, LCD, or CRT, monochrome or color).

E8: Any Example E1-E7, further including a battery cell (e.g., UPS) housed within the protective enclosure of the apparatus to provide battery power/backup to components.

E9: Any Example E1-E8, further including an optional HVAC unit housed within the protective enclosure of the apparatus to provide cooling, heating, and humidity control to components.

E10: A media display client apparatus (as described in FIGS. 2-6G) may house certain components of the media display client system 120 outside the protective enclosure. Sensors (e.g., RADAR, LIDAR, and cameras) in any configuration or combination may be housed outside the protective enclosure (for example, on top of the apparatus, mounted on the surface of the vehicle, or mounted within the frame of the vehicle as part of the vehicle system). Audiovisual display units are housed inside the protective enclosure.

E11: Example E10 further including a computing system (e.g., processing system, interface system, computer-readable storage media, program instructions) housed outside the protective enclosure of the apparatus, but on or within the mobile vehicle (for example, in the vehicle system, in the trunk or other enclosure of the mobile vehicle, etc.).

E12. Any Example E10-E11, in which the GPS component is housed outside the protective enclosure of the apparatus but within the mobile vehicle (e.g., part of the vehicle system or the computing system).

E13. Any Example E10-E12, further including camera components mounted on top of the apparatus, mounted on the surface of the vehicle, or mounted within the frame of the vehicle as part of the vehicle system.

E14. Any Example E10-E13, in which the audiovisual display units are tablet computers.

E15: Any Example based on E14, in which the front camera of each tablet computer serving as an audiovisual display unit is a camera component operative to capture a still image or a video from the outbound viewpoint of the respective audiovisual display unit.

E16: Any Example E10-E13, in which the audiovisual display units are monitors (e.g., LED, LCD, or CRT, monochrome or color).

E17: Any Example E10-E16, further including a battery cell (e.g., UPS) housed within the mobile vehicle to provide battery power/backup to components.

E18: Any Example E10-E17, further including an optional HVAC unit housed within the mobile vehicle that provides cooling, heating, and humidity control to components via tubing connecting the protective enclosure of the apparatus and an HVAC vent within the mobile vehicle.

Figure 7C:
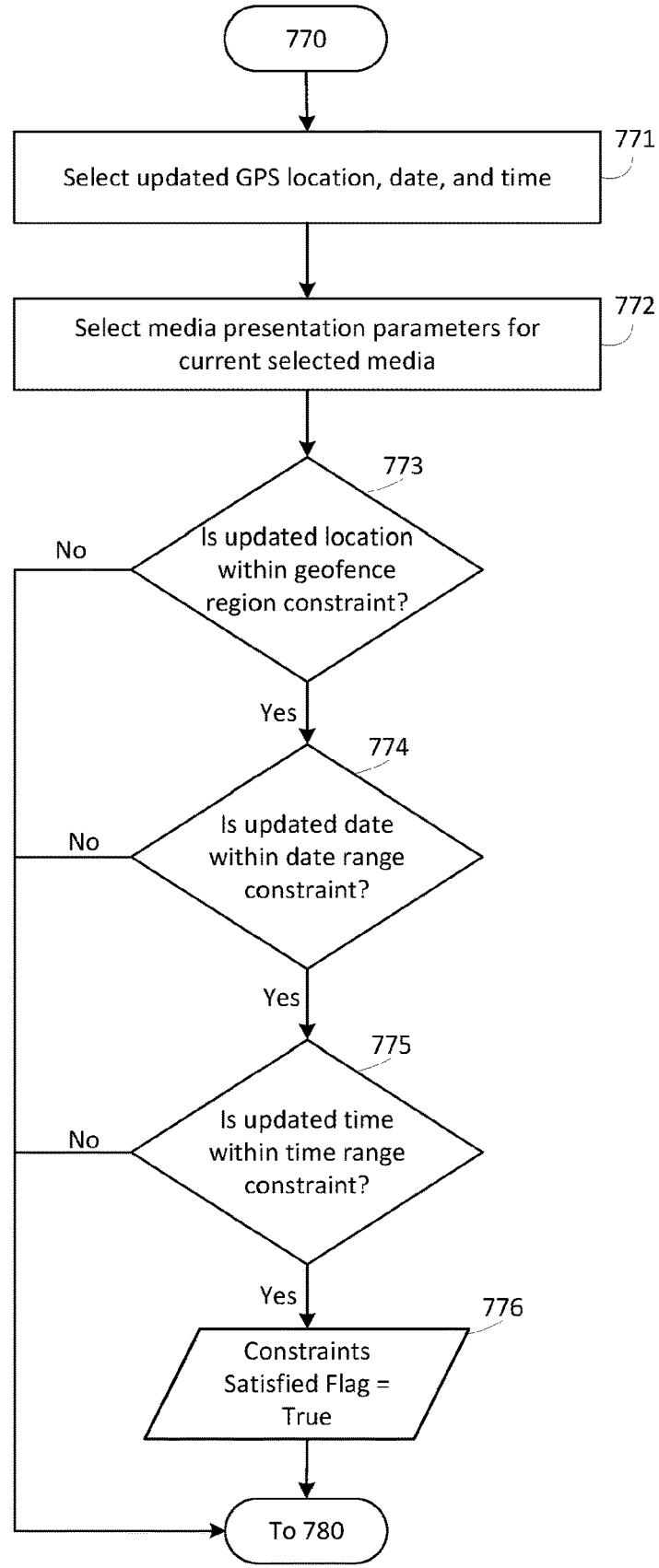
Figure 7D:
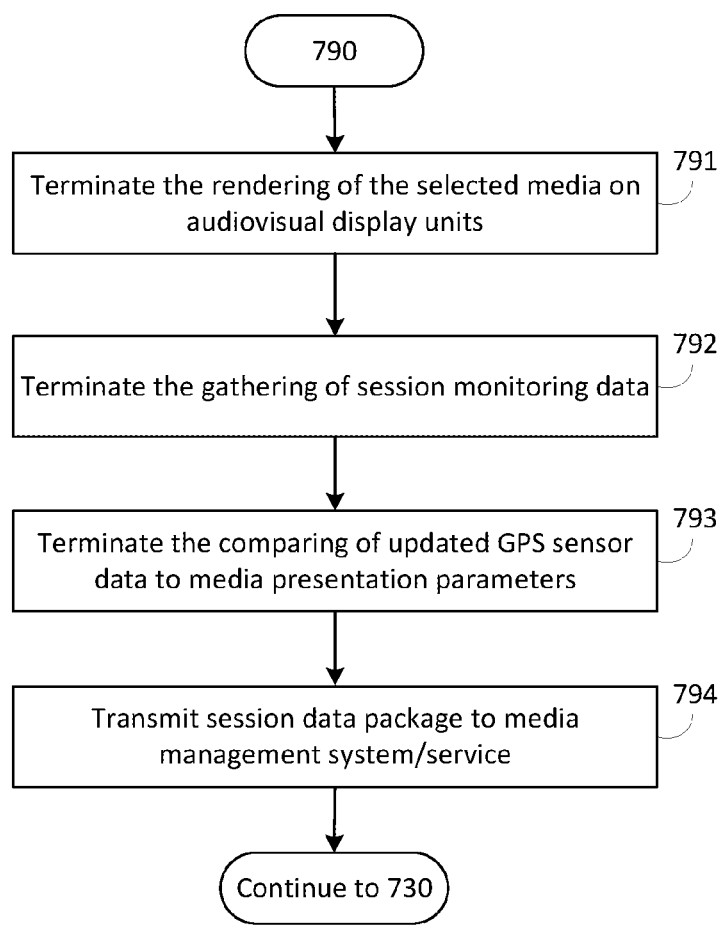

FIGS. 7A-7D show example process flows that may be executed in some embodiments of a media display client system. FIG. 7A depicts an example of a high-level process flow for requesting/receiving digital media, displaying media, obtaining telemetry relevant to audience estimation, and validating media presentation constraints at a media display client system associated with a mobile vehicle. FIGS. 7B-7D show subprocesses relevant to the high-level process flow of FIG. 7A.

In FIG. 7A, a media display client system (such as the one described in conjunction with FIGS. 1 and 1A-1C, or that may be a component of a media display client apparatus as described in FIGS. 2-6G) periodically, on a media package request time interval, obtains GPS sensor data (700) from the media display client system's GPS component. The "media package request time interval" describes the amount of time that elapses between media package requests from the media display client system to the media management system/service. A media package request time interval may be any discrete and measurable time interval—measured, for example, in milliseconds, seconds, minutes, hours, or days. In some cases, the media package request time interval is configurable, for example, by a default setting on the media management system/service, or for each media display client system via a user interface element. In some cases, the media package request time interval may be self-configuring based on, for example, network quality, geolocation of the media display client system, time of day, or other properties.

"GPS sensor data" describes, at least, location data about the geolocation of the media display client system, as well as date data and time data descriptive of the local or universal time at which a specific instance of location data was obtained or accessed. In some embodiments, additional information may be obtained from the GPS component, and that information may be sent along with the GPS sensor data. GPS sensor data, as used in this instance, provides information about the media display client system's geolocation (and time) that is sent in a media package request so that the media management system/service can determine appropriate media for presentation at the specific place and time where the media display client system is currently present.

A media package request comprising the GPS sensor data is sent, for example, to the media selection service of a media management system/service (710). A media package request contains at least GPS sensor data (e.g., location at a particular date and time) of the requesting media display client, as well as a unique identifier of the media display client system so that the media management system/service can associate the media package request with session data to be received later from the same media display client system. Other information may of course be included to support system functioning. The media package request is formatted, for example, in accordance with an API made accessible by the media selection service (as described in reference to FIG. 1) and is sent (and subsequently received) over a communications interface of the media display client system that interfaces with a network. The request (and the response) may be synchronous or asynchronous.

After some delay for the media selection service to process the media package request, the media display client receives and processes the media package (720) returned by the media selection service. When received, the media package, which may be compressed or bundled as a set of files or binary objects within a larger data file, may be unpacked into its logical structural parts. As also described in regard to FIG. 8A, a media package contains, at least, an ordered set of media, a media schedule for its presentation/display, and media presentation parameters. The media presentation parameters include constraints such as a geofence region constraint, a date range constraint, and a timeframe range constraint. In some embodiments, additional constraints may be sent as part of the media presentation parameters. These aspects of a media package are described further below.

Figure 11A:
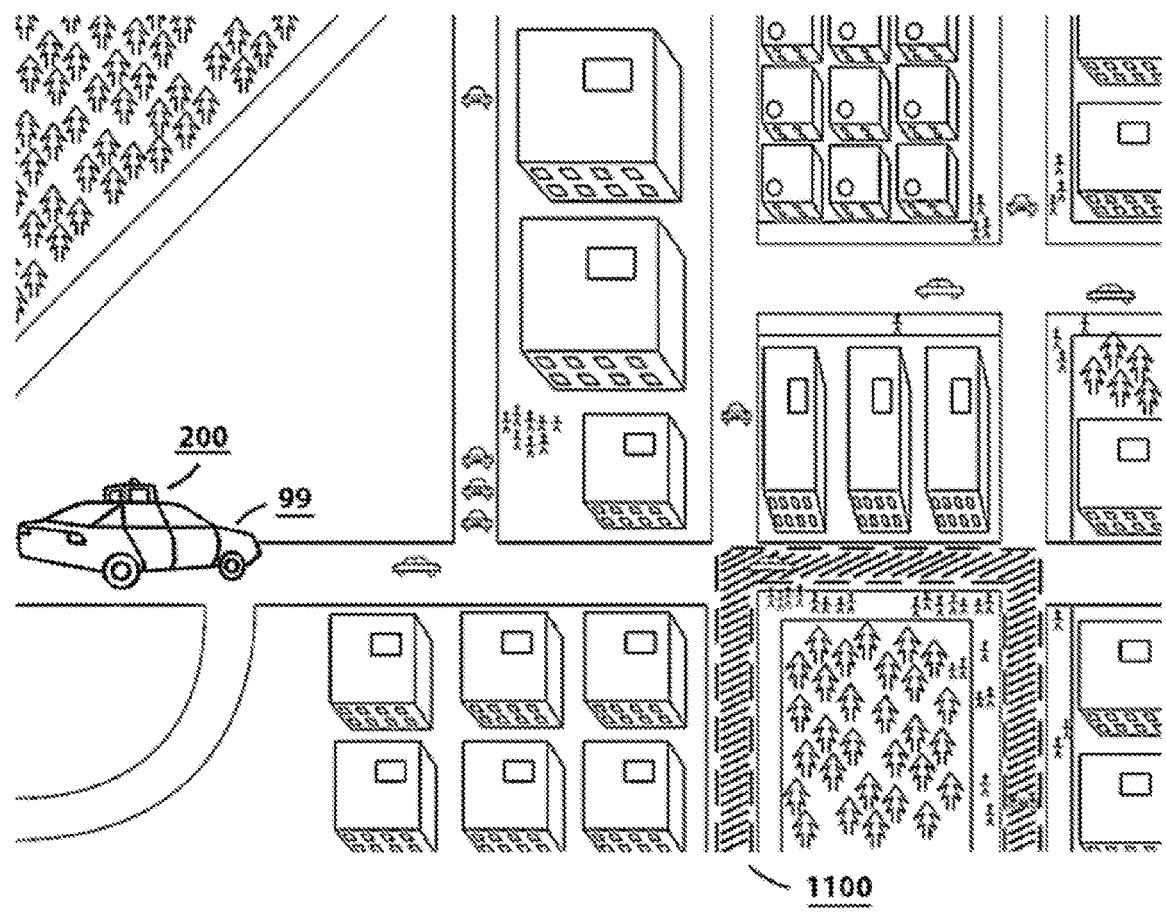
FIGS. 11A-B show street maps with various representations of geofence region constraint.
Figure 11B:
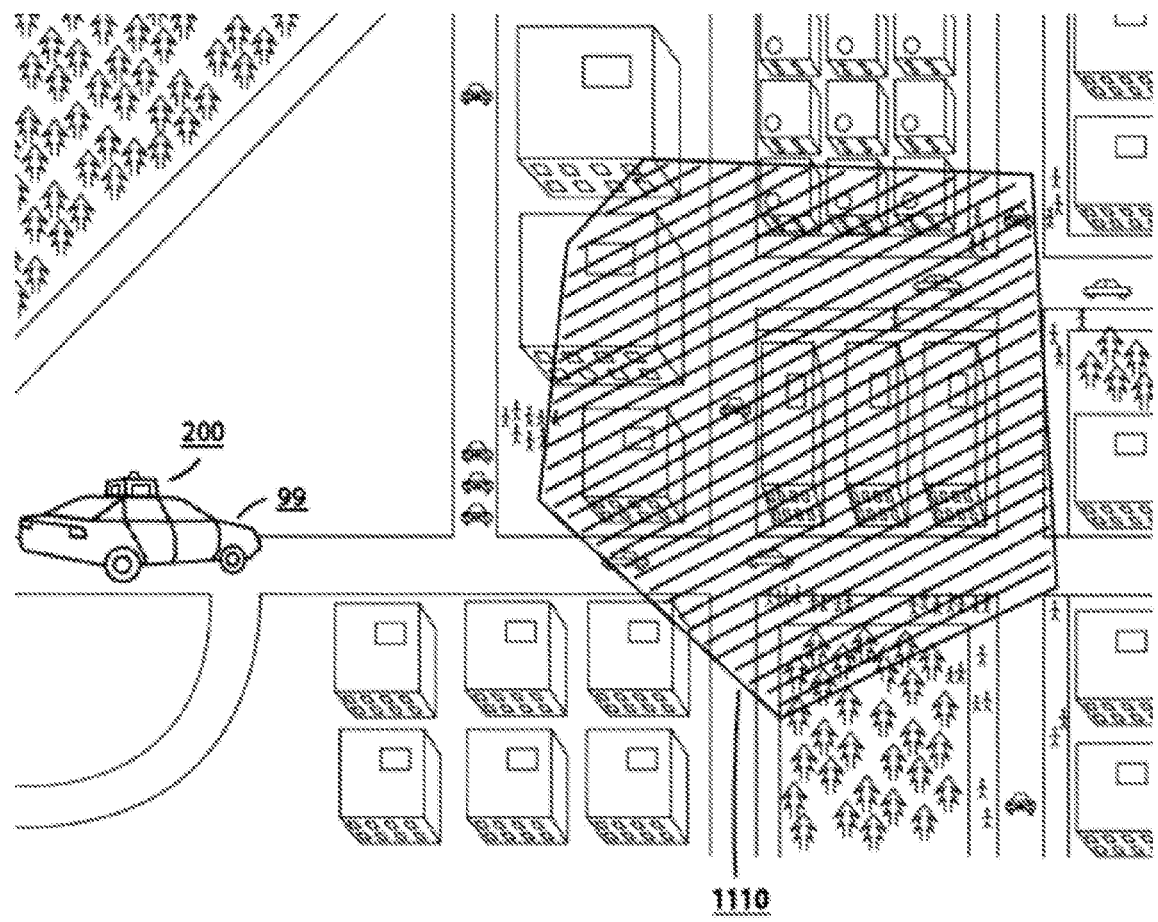

The geofence region constraint describes a bounded geographic space (which may be depicted as a two-dimensional figure on a map) that the media display client system must be located within in order to validly display an individual media item or compound media item. In geographical regions that lie outside the geofence region constraint, presentation of the media item is not valid. The geofence region constraint may be described variously. In one example, the geofence region constraint is described as a set of three or more GPS coordinates that define a bounded space of three or more sides when joined by a line. As an example, FIG. 11B shows a street map with a mobile vehicle 99 conveying a media display client apparatus 200; demarcated by shading is an irregular-shaped six-sided polygon defining a geofence region constraint 1110. In another example, the geofence region constraint is described by a set of intersecting streets describing, e.g., a city block. FIG. 11A shows an example street map with a mobile vehicle 99 conveying a media display client apparatus 200; demarcated by the shading is a hollow rectangle defined by four intersecting streets that defines a geofence region constraint 1100. A geofence region constraint may also be described using one or more individual, nonintersecting street names. A geofence region constraint may be described as a circular zone defined by a single GPS coordinate or location, and a distance/radius from the single point. Other examples of geofence region constraint descriptions are, of course, possible.

A date range constraint describes a calendar-based selector that the current date must be within for the media display client system to validly display the associated media item. The date range constraint can be described variously; examples include: a single specific calendar day or range of specific calendar days (e.g., "6/15/2019", "6/15/2019-6/18/2019"); a recurring pattern of days, such as a day or days of the week (e.g., "every Monday", "Weekend days", "Work days", "every Monday and Thursday"), a day or days of the month (e.g., "the first Monday of every month", "April 1 of every year", "the 5th of every month"); or periodically based on a formula (e.g., "every 5 days", "10 days after the media was last displayed"). Other examples of date range constraint descriptions are, of course, possible.

A timeframe range constraint describes a time-of-day based selector that the current time must fall within for the media display client system to validly display the associated media item. The timeframe range constraint can be described variously; for example, a single specific time of day, range of times of day, or set of ranges (e.g., "12 pm", "12 pm-1 pm", "12-1 pm and 3-5 pm"); a recurring pattern of times of day (e.g., "every 3 hours"); periodically based on a formula (e.g., "3 hours after the media was last displayed"); or based on patterns set by other dynamically altering properties (e.g., "only after dark", "during the daytime"). In some embodiments, the timeframe range constraint may also indicate a duration for which the associated media item should be displayed once it begins to display.

The date range constraint and timeframe range constraint may be set together to select timeframe ranges and date ranges in conjunction. They may also be set independently such that, for example, without a date range constraint, a timeframe range constraint is associated with every calendar day. In some embodiments, constraints may be described as exclusionary. For example, the geofence region constraint may describe geofence regions within which the associated media item should NOT be displayed, all other zones being valid (e.g., "not in the geofence region in a two mile radius around the airport"); the date range constraints may describe date ranges during which the associated media item should NOT be displayed, all other dates being valid (e.g., "not on Christmas day"); the timeframe range constraints may describe time-of-day ranges during which the associated media item should NOT be displayed, all other times of day being valid (e.g., "not between midnight and 2 am").

Selected media are determined from the ordered set of media corresponding to the media schedule (730). The media display client system determines "selected media" (i.e., the next individual or compound media item to be displayed) by accessing the media schedule and then computing the appropriate media to display based on alignment between the current GPS sensor data (e.g., location data, date data, and time data) and the media presentation parameters (e.g., geofence region constraints, date range constraints, and timeframe range constraints) associated with each of the media in the ordered set of media.

In general, the set of media received from the media selection service is "ordered" for priority according to a service-determined ordering algorithm at the time the media package request was processed. However, as previously noted, in some operational instances or different embodiments, the media package may have an ordered set of media containing several media items. This may occur, for example, because of the nature of connectivity to a particular media display client system or other factors. Thus, in some instances, a media package may contain, e.g., a quantity of media suitable for an entire day. In addition, as the mobile vehicle conveying the media display client system moves around according to the driver's own will and other factors, the GPS sensor data will change unpredictably. Therefore, a technical feature of certain described embodiments is that media for display are assessed locally by the media display client system on a periodic basis to determine an appropriate selected media item for display. This technical feature is enabled by the design in which the media selection service conveys a media package containing sufficient information (e.g., a range of media, media schedule, and media presentation parameters) for the media display client system to determine the specific next media item to display, rather than merely being instructed by the media selection service to display a single particular media item. The technical advantage is that media for display can be more appropriately chosen, and efficient, in light of potentially changing local conditions and vehicle movements.

Once chosen, the selected media are rendered on the one or more audiovisual display unit(s) (740). Characteristics of audiovisual display unit(s) were described with respect to the FIG. 1-1C series. In some cases, rendering the selected media includes transforming its associated media file(s) (e.g. image(s) or video(s)) or streams into instructions via the graphics processing system and audio-video interface. In some embodiments, selected media may include a plurality of media being rendered simultaneously, with each individual media item being rendered on a separate audiovisual display unit (e.g., media item 1 may be rendered on audiovisual display unit 1 at the same time as media item 2 is rendered on audiovisual display unit 2).

During the display of the selected media on the audiovisual display unit(s), the periodically recurring process of gathering and storing session monitoring data (750) recurs with a periodicity determined by the length of the monitoring time interval. Session monitoring data, broadly speaking, includes data gathered from media display client system sensor components that is relevant to audience estimation (e.g., the number of persons, viewing conditions of persons, and/or attention duration of persons who are proximate to the media display client system such that the selected media can be seen by them while being rendered on at least one audiovisual display unit). Session monitoring data includes a number of aspects further described below.

The "monitoring time interval" describes the amount of time that elapses between the repetition of processes that obtain and store data from media display client system components such as the GPS sensor, and object sensor component array. A monitoring time interval may be any discrete and measurable time interval-measured, for example, in milliseconds, seconds, minutes, hours, or days. In some cases, the monitoring time interval is configurable, for example, by a default setting on the media management system/service, or for each media display client system via a user interface element. In some cases, the monitoring time interval may be self-configuring based on, for example, the nature or capabilities of the components of the media display client system, network quality, geolocation of the media display client system, time of day, or other properties.

FIG. 7B shows an example sub-process flow of process 750 from FIG. 7A to describe gathering and storing session monitoring data in more detail.

Processing of the recurring sub-process flow 750 initiates in each instance with accessing sensors of various types. Object sensor(s) in the object sensor component array are accessed (751), including camera components, and GPS sensors of the GPS component are accessed (755). Accesses to obtain data from these sensor(s) may be performed by the system as serially executing steps or as steps executed in parallel processes/threads of the processing system or operating system. Accesses to object sensor(s), cameras, and GPS sensors may be performed, for example, by software on the media display client system that makes calls to operating system or hardware libraries/drivers via an API or other interface of the respective sensor type. The object sensor component array, camera components, and GPS component are described structurally and in various embodiments with regard to the FIG. 1-1C series.

Various kinds of data points relevant to audience estimation are collected during the accessing of the object sensor(s) via their respective APIs/interfaces. For example, the type, direction, speed, and distance of objects near the mobile vehicle conveying the media display client system may be collected (752). Data points from different types and numbers of object sensor(s) may be combined in some embodiments to obtain the data points relevant to audience estimation.

For example, LIDAR object sensor(s) can be used to very accurately determine the distance of an object from the LIDAR sensor. In some cases, the type of object being detected can be analyzed via LIDAR data. For example, segmentation of objects from raw LIDAR data can be performed, in its simplest aspect, by analyzing the 2D LIDAR data using L-shapes or bounding boxes and verifying them against simple rules. Additional LIDAR-data techniques may be used to obtain 3D data points from the LIDAR sensor and segment them into candidate object type classes separate from the background field.

RADAR-type object sensor(s) can be used to determine the speed, distance, and/or direction of objects near the mobile vehicle conveying the media display client system. In some embodiments, radar data may be analyzed to determine the shape of objects in order to classify them by object type. Classification of object types by radar data can be performed, for example, by comparing the known radar signatures of target object types (e.g., pedestrians, automobiles, motorcycles, bicycles, trucks, etc.) to the radar data signature from the object sensor(s).

In some embodiments, images and/or video captures may be collected from the camera components (754). Images and/or video captures may be used to classify objects that are relevant to audience estimation. Classification of object types by image or video data can be performed, for example, by comparing the known image patterns of target object types (e.g., pedestrians, automobiles, motorcycles, bicycles, trucks, etc.) to the images or videos collected by the camera components. Images and video captures may be analyzed to perform face identification within the image or videos, indicating the presence of an audience member within viewing range of the selected media. For example, anonymous video analytic (AVA) software allows counting of faces without violating the privacy of persons in the image or determining the identity of particular persons.

In some embodiments, images and/or video captures taken from the camera components are analyzed to determine the extent to which the selected media being rendered on the audiovisual display units is visible to audiences. The image or video captures may be used to monitor for the presence of obstructions which might impact an audience's viewing of the selected media, e.g., a truck passing on the right side of the mobile vehicle might block the visibility of the right-side audiovisual display unit(s) to pedestrians; a street sign, hill, highway barrier wall, parked automobiles, trees, bushes/foliage, the walls of buildings or yards, and other landscape features might block the viewing of one or more audiovisual display units (e.g., FIG. 4 shows an example of debris obstruction).

In some examples or embodiments, the image or video captures may be used to determine the presence of lighting or obfuscation factors impacting the audience's viewing ability. For example, bright sun (or a bright moon), headlights, or other strong lighting may impact viewability; the presence of dust, snow, rain, fog, frost, dew or surface moisture, leaves, or other debris that block the audiovisual display unit(s) might be detected by the camera components facing outward from the media display client system/apparatus. In some embodiments, a user operating the media display client system may be warned or notified via the client interface of the presence of such factors so that actions such as cleaning can be performed (e.g., some embodiments of apparatus may include washer/wiper system to clean the sides/panels).

In some embodiments, classification of object types may be enhanced by training a neural network with object sensor data (e.g. from LIDAR, RADAR, and camera image data) from known object types, and then instructing the trained neural network to classify object sensor data according to its training model.

By accessing the GPS sensor(s) (755), updated time, updated date, updated location, updated speed, and updated direction data of the media display client system are obtained (756). Updated GPS data about the media display client system are used in a variety of ways, including route calculation, tracking, and audience estimation. Certain updated data is used to confirm that constraints are being satisfied with respect to media presentation parameters (e.g., geofence region constraints, date range constraints, and timeframe range constraints) (see FIG. 7C and discussion). Speed and direction data may be further used in some embodiments for audience estimation, for instance, by calculating the delta of the vector of the speed and direction of the media display client system with respect to the vectors of objects detected by the object sensor(s) and/or cameras. For example, an occupant of a vehicle moving at a high velocity in the opposite direction from the mobile vehicle conveying the media display client system will have less viewing time (and hence less audience value) than a vehicle moving at a similar velocity in the same direction as the mobile vehicle.

In certain embodiments, updated time, date, and location data may be used to retrieve weather condition data in respect to the media display client system's current environment. Weather condition data may be obtained, for example, by using the communications interface of the media display client system to connect over a network with a weather data provider which provides weather condition data, e.g., via an API. Weather condition data may be used in some embodiments in audience estimation.

In some embodiments, a route map is generated and periodically updated (758) with the updated time, date, and location data. A route map may represent a consolidated view of the media display client system's activities over a period of time and be stored in lieu of or in addition to individual GPS sensor data points.

In some embodiments (not reflected in this process flow), the media display client system may adjust the power state or brightness level or contrast level of one or more of the audiovisual display units based on the updated GPS data (e.g., updated time data, date data, and location data. The technical advantage of this technical feature is that, in locations or jurisdictions that do not allow audiovisual display units pointing in some direction (e.g., forward or backward), the rendering of the media on the audiovisual display units may automatically cease without violating local constraints. Some jurisdictions may also not allow media displayed in excess of a certain brightness at certain times of day or days (e.g., past 10 pm, on Sundays due to local ordinances, etc.). Some locations or times of day may benefit from increased or lower contrast of the audiovisual display units.

Figure 12:
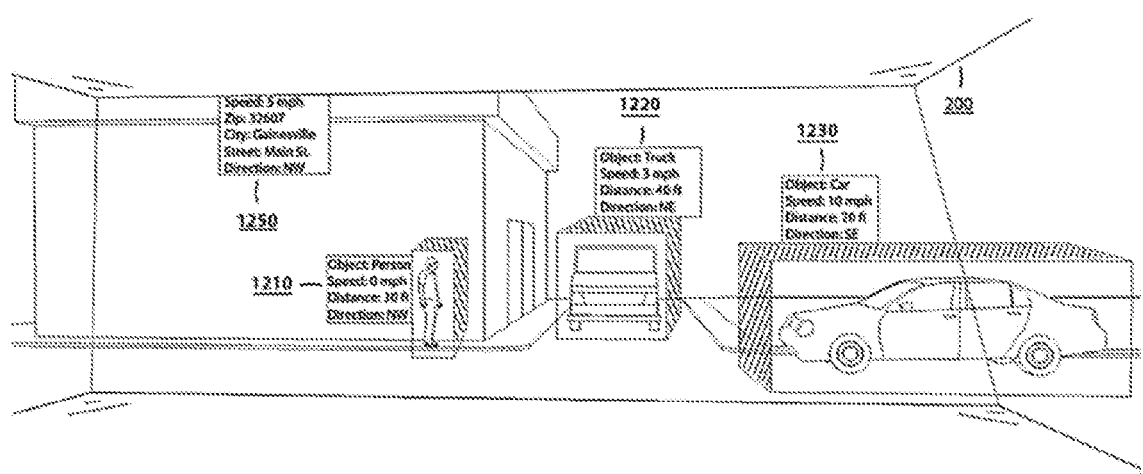
FIG. 12 shows an example diagram of the object sensor data points of several objects as shown from the outbound viewpoint of a media display client apparatus.

To illustrate, FIG. 12 shows an example diagram of the object sensor data points of several objects as shown from the outbound viewpoint of a media display client apparatus 200. The figure shows several objects detectable using object sensor(s) and cameras. A pedestrian 1210 has been detected, being determined by the media display client system as a "person, 30 feet away, heading northwest at speed of 0 miles per hour." A vehicle 1220 has been detected, determined by the media display client system as a "truck, 40 feet away, heading northeast at a speed of 3 miles per hour." Another vehicle 1230 has been detected, determined by the media display client system as a "car, 20 feet away, heading southeast at a speed of 10 miles per hour." Also indicated are the location, speed, and direction data 1250 of the mobile vehicle conveying the media display client apparatus 200, as obtained from GPS sensor(s), shown to be "at Main St., zip code 32607, city of Gainesville, heading northwest at a speed of 5 miles per hour."

Returning now to FIG. 7B, having gathered and collected data points from object sensors and GPS sensors, the data points are stored in a session data package (759) pertaining to this particular media session. A "session data package" may be organized and stored on the computer-readable storage media in any manner that can be readily understood by a processing system and/or software thereon, and conveyed via a network to, e.g., the session service 164 of a media management system/service (see FIG. 1). A session data package may be stored on computer-readable storage media accessible over a network, e.g., a cloud storage service. In some example embodiments, records or tables in a relational or No-SQL database may be used to store the session data package; in other embodiments, an operating system file with an XML or JSON format (or having a custom storage structure) can be used to organize the session data package.

In some embodiments, the session data package may store individual data points from individual sensors or sensor types. In other embodiments, the data points may be aggregated together to record a composite sensor state during a particular time slice. In some embodiments, for efficiency, data points may not be stored at all when they are not indicative of object types that indicate audience members. Sometimes the data points may be processed into more summarized formations, e.g., for greater storage efficiency—as when individual GPS coordinates/data points are assembled into a route map and the route map is stored rather than the individual GPS sensor data points. Other information may also be included in the session data package to serve as contextual or identifying information, such as a media display client system ID, a unique session ID, start and stop times for the session or for each individual sensor reading, and other information without limitation.

The subprocess flow of FIG. 7B resumes at FIG. 7A, element 770, during which processing step certain data gathered by the GPS sensor(s) is compared to constraints from the media presentation parameters associated with the selected media.

FIG. 7C shows an example sub-process flow of process 770 from FIG. 7A to describe constraint comparison processes in more detail. In FIG. 7C, the most recent updated GPS location data, updated date data, and updated time data is selected (771) from the session data package (or another/temporary storage location) where it was stored during subprocess 750 (from FIG. 7B). The media presentation parameters for the currently selected media are obtained from the media package (772). Recall that the media presentation parameters include at least a geofence region constraint, date range constraint, and a timeframe range constraint that must be satisfied for the media display client system to validly render the selected media.

A series of tests are performed to determine whether the most recently updated location, date and time of the media display client system are within the constraints of the media presentation parameters associated with the selected media. In this example, the updated location data is checked to see if it is within the current geofence region constraint (773). Recalling FIGS. 11A-11B momentarily for illustration, the media display client system 200 is not within the geofence region constraint 1100 (in FIG. 11A) or 1110 (in FIG. 11B), thus the geofence region constraint would be violated. If the geofence region constraint is violated, the subprocess flow 770 of FIG. 7C is immediately exited to processing step 780 of FIG. 7A.

If the first constraint is not violated, processing proceeds. The updated date data is checked to determine if it is within the date range constraint (774). If the updated date data does not match or concur with the dates or ranges of the date range constraint (i.e., the constraint is violated), the subprocess flow 770 of FIG. 7C is immediately exited to processing step 780 of FIG. 7A.

If the prior constraint is not violated, processing proceeds. The updated time data is checked to determine if it is within the time range constraint (775). If the updated time data does not match or concur with the times or ranges of the time range constraint (i.e., the constraint is violated), the subprocess flow 770 of FIG. 7C is immediately exited to processing step 780 of FIG. 7A.

If all of the constraints in the media presentation parameters for the selected media are satisfied, the "Constraints Satisfied Flag" (a local or persistent variable) is set to "TRUE" (776). The subprocess flow 770 of FIG. 7C then returns or continues to processing step 780 of FIG. 7A.

It should be noted that FIG. 7C, in representing the process flow for testing GPS location, date, and time against constraints, is exemplary only. The tests may be conducted serially, in any order, and even in parallel.

Returning now to the process flow of FIG. 7A at element 780, the Constraints Satisfied Flag is checked for its truth value. If the Constraints Satisfied Flag is equal to "TRUE", then the process flow continues, waiting for the next monitoring time interval to elapse (785). When the monitoring time interval elapses, the process flow reverts to its next iteration of gathering and storing session monitoring data (750).

If the Constraints Satisfied Flag is equal to "FALSE", then the process flow immediately continues and performs termination processes (790) as described in more detail in the subprocess flow of FIG. 7D.

FIG. 7D shows an example sub-process flow of process 790 from FIG. 7A to describe media session termination processing in more detail. In FIG. 7D, the rendering of the currently selected media on the audiovisual display unit(s) is terminated (791). The gathering of session monitoring data (represented in FIG. 7B) for the current media session is also terminated (792). The termination of the gathering of session monitoring data may include ceasing the collection of object sensor data, image or video captures, and updated GPS sensor data. The storage for the session data package is committed or closed and written to the computer-readable storage media. Also terminated is the process of comparing updated GPS sensor to the media presentation parameters of the currently selected media (793).

The session data package for the current (i.e., just terminated) media session is transmitted to the media management system/service (794). In some embodiments or instances, the session data package may be sent to the media management system/service immediately (e.g., when the media display client system is connected to a 5G network). In other cases, since the session data package may contain large amounts of data, it may be queued for sending when the media display client system is able to connect, using the communications interface, to a desirable network—for example, a WiFi network or network with a certain connection speed might be preferred to a cellular data network such as LTE. Desirable networks may in some cases be configured by the user-operator of the media display client system with a client interface. It should be noted that in embodiments of a media management system/service having a session service subcomponent (e.g., 164 of FIG. 1), the session data package may be transmitted to the session service subcomponent.

After the termination processes encompassed in subprocess flow 790 have been completed, the process flow reverts to its next iteration of media selection in correspondence with the media schedule and initiates a new media session (730), as represented in FIG. 7A.

In some embodiments, the media display client system may include an additional processing step (not shown in FIG. 7A) to send a request to the media selection service to determine if any updates have occurred to the media schedule or media package. If the current media package is outdated, the media display client system may initiate a new, full media package request. Checking for an outdated media package may occur, for example, when the next media session is initiated during the transition from step 790 to step 730; when a certain number of digital media have been rendered; or after a certain time has elapsed (e.g., every hour).

Figure 8A:
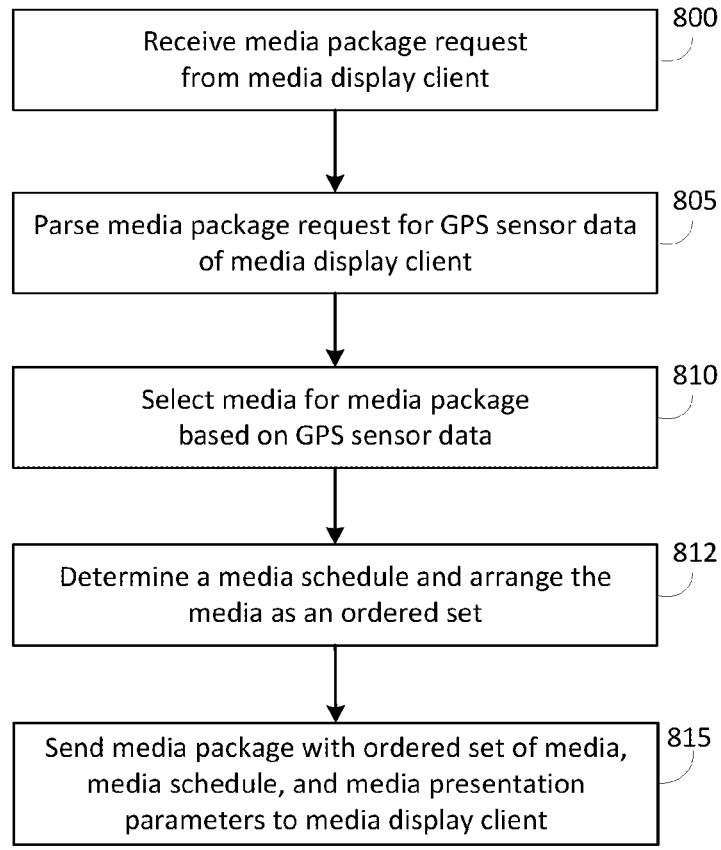
FIG. 8A depicts an example of a process flow for receiving a media package request from a media display client system, selecting appropriate media for the media display client system, and sending a media package to the media display client system.
Figure 8B:
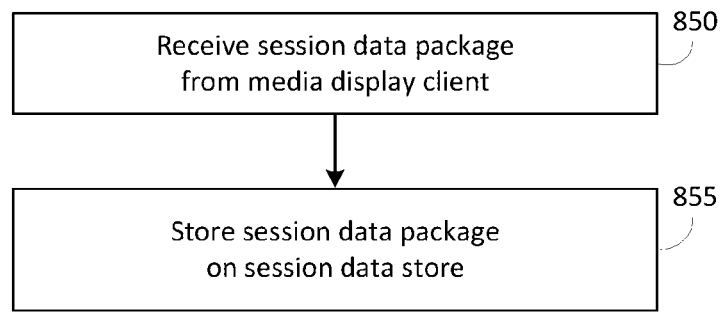
FIG. 8B depicts an example of a process flow for receiving and storing a session data package from a media display client system.

FIGS. 8A-8B show example process flows for dynamic selection of media and session data processing that are performed by a media management system/service in some embodiments.

FIG. 8A depicts an example of a process flow for receiving a media package request from a media display client system, selecting appropriate media for the media display client system, and sending a media package to the media display client system. The process flow of FIG. 8A may be performed, in some embodiments, by a subcomponent of the media management system/service, such as the media selection service 162 (from FIG. 1).

A media package request is received from the media display client (800) (e.g., via an API of the media selection service as described in FIG. 1). The characteristics of a media package request are described in relation to FIG. 7A. Briefly, however, the media package request comprises GPS sensor data (e.g., location at a particular date and time) from the GPS component of the requesting media display client, as well as (at least) a unique identifier of the media display client system so that the media management system/service can associate the media package request with session data to be received later from the same media display client system.

The media package request is parsed (or processed) for the GPS sensor data from the requesting media display client system (805). Media for a media package that will be returned to the requesting media display client system is selected based on the GPS sensor data (810). The selection may be performed by reviewing the repository of available media and their media presentation parameters, which include display constraints, and finding the available media whose display constraints match the location data, date data, and time data from the GPS sensor data. Types of display constraints may include geofence region constraints, date range constraints, and timeframe range constraints during which a media item may be displayed.

The media, media presentation parameters, and media scheduling information may be stored in a media package store 151 as described in regard to FIG. 1. A media package store 151 may be organized and stored on the computer-readable storage media in any manner that can be readily understood by a processing system and/or software thereon. In some example embodiments, records or tables in a relational or No-SQL database may be used to store the media package store; in other embodiments, an operating system file with an XML or JSON format or having a custom storage structure can be used to organize the media package store 151. Combinations of these techniques in association with files in a file system may be used.

FIG. 9A shows an example representation of a media package store 151, organized as a table in a relational database. In FIG. 9A, data properties are shown as attribute columns, with each non-header row denoting a media reference and its data properties. Attribute columns may include, for example, a unique id 900, the media file referent 901, the date range 902, the timeframe range 903, and the geofence region 904. The media itself may be stored in the file system with a referent (e.g., 901) to the media file name in the media package store. An example record 905 is shown to represent a media item ("picture-123.jpg") associated with its data properties. This representation of a media package store is exemplary only and not intended to be limiting.

Returning now to FIG. 8A, more than one media item may be selected, in which case a media schedule is determined utilizing each of the selected media item's media presentation parameters. The media package may be arranged, in accordance with the media schedule, as an ordered set of media (812). In some embodiments, the determination of the media schedule may further consider additional prioritization factors (such as the media's economic value). In some cases, the media schedule may be ordered to support more simplified or efficient processing by the media display client system. The ordered set of media can contain one or more of still image files, animated image files, video files, and sound files, as well as "streams" of such media formats. The media in the media package can be actual media files, but in some embodiments may be a reference to media already downloaded by the media display client system (for example, as part of a previously sent media package or as part of a media download process occurring previously or asynchronously).

A media package is assembled using the selected media as an ordered set, the media schedule, and the media presentation parameters associated with each media item in the ordered set. The media package is sent to the requesting media display client (815) over the communications interface using methods and/or formatting as described previously.

FIG. 8B depicts an example of a process flow for receiving and storing a session data package from a media display client system. The process flow of FIG. 8B may be performed, in some embodiments, by a subcomponent of the media management system/service, such as the session service 164 (from FIG. 1).

The session data package is received by the media display client (850) over the communications interface. Options for structure, transmission, and formatting of the session data package were described in regard to FIG. 7A. The session data package is then stored on a session data store (855). The session data package may have a media display client identifier, media package identifier, and/or media identifier so that the session data package may be associated with the media package request that instigated the media session the session data package pertains to.

The session data package may (or may not) be transmitted with the same physical or logical representation in which it is stored by the media management system/service. For instance, it may be transformed from the JSON representation in which it was sent to a relational structure when stored in the session store. For example, raw sensor data points may be processed into a more summarized structure for storage in the session store.

In some embodiments, the session data from the media display client system may be stored on the media management system/service in a session store 152 as described in regard to FIG. 1. A session store 152 may be organized and stored on the computer-readable storage media in any manner that can be readily understood by a processing system and/or software thereon. In some example embodiments, records or tables in a relational or No-SQL database may be used to persistently store the session store; in other embodiments, an operating system file with an XML or JSON format or having a custom storage structure can be used to organize a session store 152. Combinations of these techniques in association with files in a file system may be used.

FIG. 9B shows an example representation of a session store 152, organized as a table in a relational database. In FIG. 9B, data properties are shown as attribute columns, with each non-header row denoting a media session of a media display client system and its data properties. Attribute columns may include, for example, a unique session id 910, user (e.g., media display client system) id 911, the referent to the original media id 900, the session date 912, the session start time 913, the session stop time 914, the route map 915 (stored as a referent to a file), captured images/video 916 (stored as a referent to a compound file), and an estimate of the audience reach 917. Files may be stored in the file system with a referent (e.g., 915, 916) to the file name in the session store. An example record 920 is shown to represent a media session ("78301") associated with its exemplary data properties. This representation of a session store is exemplary only and not intended to be limiting.

Figure 10:
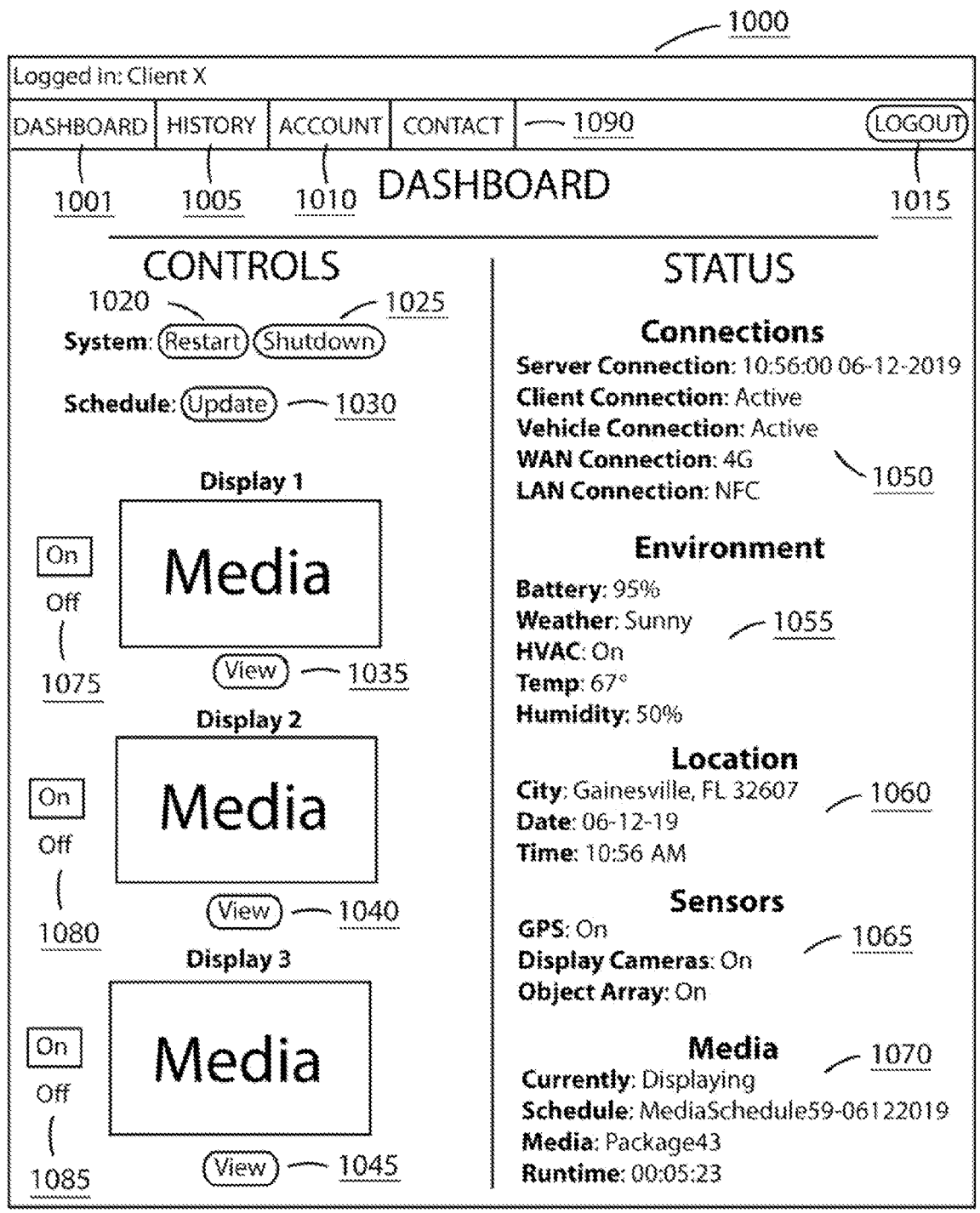
FIG. 10 shows an example interface with user interface elements so that a user-operator can manage the configuration and operations of, and monitor the status of, the media display client system/apparatus.

FIG. 10 shows an example interface with user interface elements so that a user-operator can manage the configuration and operations of, and monitor the status of, the media display client system/apparatus. User interface screens such as 1000 may be presented as part of an application that runs on a client interface (e.g., 130 from FIG. 1). Interface 1000 may be presented on a specialized device (e.g., an in-dash interface device), or on a standard device, such as a mobile device or tablet, for example through a mobile "app". Interface 1000 may be available via a web browser application on a mobile device or desktop computer independently from the media display client system/apparatus. It should be noted that the example user interface screens in FIG. 10 are merely one way for a user-operator to interact with a media display client system using visual and/or touch screen-related user interaction motifs; others are possible. In some embodiments, for example, voice commands and other natural language processing may be used to control media display client system, perhaps by connecting the media display client system to a conversation/assistant agent such as Amazon Echo®.

By interacting with the example user interface 1000 in FIG. 10, a user-operator can initiate various views of the operations of their media display client system. A "DASHBOARD" interface element 1001 (e.g., a button or touchscreen zone) shows the "DASHBOARD" view presented in user interface 1000, which allows the user-operator to control device options and see status on connections, environment, location, sensors, and media of their media display client system. Other possible interface views are accessed by interface elements for "HISTORY" 1005 (e.g., displaying an interface view for a user-operator to view the history of previous media display sessions), "ACCOUNT" 1010 (e.g., displaying an interface view for a user-operator to view account information such as personal/company info), and "CONTACT" 1090. A "LOGOUT" interface element 1015 allows the user to log out of the app's access to the media display client system.

Moving to the specific features of the "DASHBOARD" view, the "CONTROLS" area of the interface displays various controls for controlling the media display client system. The "Restart" interface element 1020 allows the user-operator to restart the media display client system's computing system. The "Shutdown" interface element 1025 allows the user-operator to shut down the media display client system. The "Update" interface element 1030 allows the user-operator to manually update the media package/schedule, for example, by initiating a new media package request outside of the periodic update schedule.

Interface elements are also present for displaying the media being rendered on the audiovisual display units. In this example, there are three audiovisual display units labeled "Display 1", "Display 2" and "Display 3". Media for each display may be shown in the "Media" thumbnail elements associated with each. Interface elements labeled "View" (1035, 1040, and 1045) allow the user-operator to view a live feed of the image or video from a camera with an outbound viewpoint from the audiovisual display units labeled as Display 1, Display 2, or Display 3, respectively. Interface elements labeled "On-off" (1075, 1080, and 1085) allow the user-operator to view and control the current operational state of each audiovisual display separately. This allows the user-operator to manually cease the rendering of media on the audiovisual display units during times when rendering is inappropriate (e.g., safety conditions, local prohibitions, lack of audience in remote areas, etc.).

In the "STATUS" area of the interface, element grouping 1050 "Connections" allows the user-operator to view the real-time status of the various connections to media display client system components (e.g., Server, Client, and Vehicle) and the networks being used (e.g., WAN, LAN). Element grouping 1055 "Environment" allows the user-operator to view the real-time status of factors such as the Battery level of the media display client system battery cell, the Weather, the HVAC/cooling unit state, the temperature, and the humidity. Element grouping 1060 "Location" allows the user-operator to view the real-time geolocation information and local time and date of the media display client system. Element grouping 1065 "Sensors" allows the user-operator to view the real-time status of the various media display client system sensors, such as the GPS sensors, display cameras (i.e., camera components), and object array (i.e., object sensor component array). Element grouping 1070 "Media" allows the user-operator to view real-time information about the currently displaying media package, media schedule, runtime, and status. FIG. 10's particular representation of a user interface for useroperator configuration, control, and monitoring of a media display client system is exemplary only and not intended to be limiting.

In some embodiments, data about the media display client system, its history, and its useroperator account and contact data may be stored on the media management system/service in a user data store 153 as described in regard to FIG. 1. A user data store 153 may be organized and stored on the computer-readable storage media in any manner that can be readily understood by a processing system and/or software thereon. In some example embodiments, records or tables in a relational or NoSQL database may be used to persistently store the user data store 153; in other embodiments, an operating system file with an XML or JSON format or having a custom storage structure can be used to organize a user data store 153. Combinations of these techniques in association with files in a file system may be used.

FIG. 9C shows an example representation of a user data store 153, organized as a table in a relational database. In FIG. 9C, data properties are shown as attribute columns, with each non-header row denoting a user of a media display client system and associated data properties. Attribute columns may include, for example, a unique user id 911, vehicle type 921, and status 922. An example record 925 is shown to represent a user ("335") associated with its exemplary data properties. This representation of a user data store is exemplary only and not intended to be limiting.

FIG. 13 shows a block diagram illustrating components of a computing device or system used in some embodiments of techniques, systems, and apparatuses for facilitating sensor-based media display management. Any component utilizing a computing system or device herein, including a media management system/service, media display client system, media display client apparatus, client interface, vehicle system, or any other device or system herein may be implemented on one or more systems as described with respect to system 1300.

System 1300 can be used to implement myriad computing devices, including but not limited to a personal computer, a tablet computer, a reader, a mobile device, a personal digital assistant, a wearable computer, a smartphone, a laptop computer (notebook or netbook), a gaming device or console, a desktop computer, or a smart television. Accordingly, more or fewer elements described with respect to system 1300 may be incorporated to implement a particular computing device. System 1300 can itself include one or more computing systems or devices or be distributed across multiple computing devices or sub-systems that cooperate in executing program instructions. The hardware can be configured according to any suitable computer architectures such as a Symmetric Multi-Processing (SMP) architecture or a Non-Uniform Memory Access (NUMA) architecture.

The system 1300 can include a processing system 1301, which may include a processor or processing device such as a central processing unit (CPU) or microprocessor and other circuitry that retrieves and executes software 1302 from storage system 1303. Processing system 1301 may be implemented within a single processing device but may also be distributed across multiple processing devices or sub-systems that cooperate in executing program instructions.

Examples of processing system 1301 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general-purpose CPU. Storage system 1303 may comprise any computer-readable storage media readable by processing system 1301.

Storage system 1303 may include volatile and nonvolatile, removable and nonremovable media implemented in any method or technology for storage of information, such as computer readable instructions, data structures, program modules, or other data. Examples of storage media include random access memory (RAM), read only memory (ROM), magnetic disks, optical disks, write-once-read-many disks, CDs, DVDs, flash memory, solid state memory, phase change memory, 3D-XPoint memory, or any other suitable storage media. Certain implementations may involve either or both virtual memory and non-virtual memory. In no case do storage media consist of a transitory propagated signal. In addition to storage media, in some implementations, storage system 1303 may also include communication media over which software 1302 may be communicated internally or externally. Storage system 1303 may be implemented as a single storage device but may also be implemented across multiple storage devices or sub-systems co-located or distributed relative to each other. Storage system 1303 may include additional elements capable of communicating with processing system 1301.

Storage system 1303 is capable of storing software 1302 including, e.g., program instructions 1304. Software 1302 may be implemented in program instructions and, among other functions, may, when executed by system 1300 in general or processing system 1301 in particular, direct system 1300 or processing system 1301 to operate as described herein. Software 1302 may provide program instructions 1304 that implement components for sensor-based media display management, rendering media, interacting with vehicle systems, controlling the object sensor component array, the GPS component, or performing any other processing operation described herein. Software 1302 may implement on system 1300 components, programs, agents, or layers that implement in machine-readable processing instructions 1304 the methods and techniques described herein.

Application programs 1310, OS 1315 and other software may be loaded into and stored in the storage system 1303. Device operating systems 1315 generally control and coordinate the functions of the various components in the computing device, providing an easier way for applications to connect with lower level interfaces like the networking interface. Non-limiting examples of operating systems include Windows® from Microsoft Corp., IOS™ from Apple, Inc., Android® OS from Google, Inc., Windows® RT from Microsoft, and different types of the Linux OS, such as Ubuntu® from Canonical or the Raspberry Pi OS. It should be noted that the OS 1315 may be implemented both natively on the computing device and on software virtualization layers running atop the native Device OS. Virtualized OS layers, while not depicted in this Figure, can be thought of as additional, nested groupings within the OS 1315 space, each containing an OS, application programs, and APIs.

In general, software 1302 may, when loaded into processing system 1301 and executed, transform system 1300 overall from a general-purpose computing system into a special-purpose computing system customized to facilitate sensor-based media display management, rendering media, interacting with vehicle systems, controlling the object sensor component array, the GPS component, or performing any other processing operation as described in various devices, systems, apparatuses, and services herein. Indeed, encoding software 1302 on storage system 1303 may transform the physical structure of storage system 1303. The specific transformation of the physical structure may depend on various factors in different implementations of this description. Examples of such factors may include, but are not limited to, the technology used to implement the storage media of storage system 1303 and whether the computer-storage media are characterized as primary or secondary storage. Software 1302 may include software-as-a-service (SaaS) loaded on-demand from a cloud service. Software 1302 may also include firmware or some other form of machine-readable processing instructions executable by processing system 1301. Software 1302 may also include additional processes, programs, or components, such as operating system software and other application software.

System 1300 may represent any computing system on which software 1302 may be staged and from where software 1302 may be distributed, transported, downloaded, or otherwise provided to yet another computing system for deployment and execution, or yet additional distribution. System 1300 may also represent other computing systems that may form a necessary or optional part of an operating environment for the disclosed techniques and systems.

An interface system 1320 may be included, providing interfaces or connections to other computing systems, devices, or components. Examples include a communications interface 1305 and an audio-video interface 1321, which may be used to interface with components as described herein. Other types of interface (not shown) may be included, such as power interfaces.

A communications interface 1305 provides communication connections and devices that allow for communication between system 1300 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here. Transmissions to and from the communications interface may be controlled by the OS 1315, which informs applications and APIs of communications events when necessary.

It should be noted that many elements of system 1300 may be included in a system-on-achip (SoC) device. These elements may include, but are not limited to, the processing system 1301, a communications interface 1305, audio-video interface 1321, interface devices 1350, and even elements of the storage system 1303 and software 1302.

Interface devices 1350 may include input devices such as a mouse 1351, track pad, keyboard 1352, microphone 1353, a touch device 1354 for receiving a touch gesture from a user, a motion input device 1355 for detecting non-touch gestures and other motions by a user, and other types of input devices and their associated processing elements capable of receiving user input.

The interface devices 1350 may also include output devices such as display screens 1356, speakers 1357, haptic devices for tactile feedback, and other types of output devices. In certain cases, the input and output devices may be combined in a single device, such as a touchscreen display which both depicts images and receives touch gesture input from the user. Visual output may be depicted on the display 1356 in myriad ways, presenting graphical user interface elements, text, images, video, notifications, virtual buttons, virtual keyboards, or any other type of information capable of being depicted in visual form. Other kinds of user interfaces are possible. Interface devices 1350 may also include associated user interface software executed by the OS 1315 in support of the various user input and output devices. Such software assists the OS in communicating user interface hardware events to application programs 1310 using defined mechanisms.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

Certain features that are described in this disclosure in the context of separate embodiments can also be implemented in combination in a single embodiment. Conversely, various features that are described in the context of a single embodiment can be implemented in multiple embodiments separately or in various suitable subcombinations. Also, features described in connection with one combination can be excised from that combination and can be combined with other features in various combinations and subcombinations. Various features can be added to the example embodiments disclosed herein. Also, various features can be omitted from the example embodiments disclosed herein.

When "or" is used herein, it is intended to be used according to its typical meaning in logic, in which both terms being true (e.g., present in an embodiment) also result in configurations having an affirmative truth value. If the "XOR" meaning is intended (in which both terms being true would result in a negative truth value), "xor" or "exclusive or" will be explicitly stated.

Similarly, while operations are depicted in the drawings or described in a particular order, the operations can be performed in a different order than shown or described. Other operations not depicted can be incorporated before, after, or simultaneously with the operations shown or described. In certain circumstances, parallel processing or multitasking using separate processes or threads within an operating system may be used. Also, in some cases, the operations shown or discussed can be omitted or recombined to form various combinations and subcombinations.

Terms mentioned herein pertaining to artificial intelligence/machine learning (AI/ML) are described as follows. The term "neural network" refers to a series of algorithms trained to perform complicated computation operations or processes in a fast and efficient manner, similar to mathematical models of the brain. Specifically, in regards to this invention, the one or more neural network is trained to detect audience viewership from a media display system, collect audience viewership data, and associate monetary costs with audience viewership data. The term "AI/ML software" refers to software, algorithms, applications, models, or one or more neural network programmed to compute similar to a human brain, which can adapt and learn. The term "AI/ML hardware/compute" refers to any processing system used to power the neural network. The term "AI/ML model" refers to software containing layered, interconnected mathematical processes that mimic the human brain processes and will be feed into the neural network. The term "inference" refers to data inferred from the neural network, specifically, audience viewership and media display session cost.

Machine learning performs exceedingly well when it comes to visual recognition. Methods such as frame-by-frame picture or video analysis can be used with labeled data sets to accurately infer various objects and object actions. A common uses for visual recognition technology include both facial recognition and object detection. The latter example is an ideal use case for this system to incorporate for audience viewership. Audience viewership, in the context of this invention, can include people and vehicles such as automobiles or other forms of human or goods transports. Parameters such as detecting the side or front portions of an object can be used to identify an audience view. For example, headlights of a car or eyes on a person's face could indicate a view. Object view obstruction could also play into whether or not an audience view can be inferred reliably. For example, debris detected between the object and the display could potentially disable the possibility of a viewership.

Images and/or video analysis may be used to monitor for object obstruction. The presence of obstructions might impact an audience's viewing of the selected media, e.g., a truck passing on the right side of the mobile vehicle might block the visibility of the right-side of the audiovisual display unit to pedestrians; a street sign, hill, highway barrier wall, parked automobiles, trees, bushes/foliage, the walls of buildings or yards, and other landscape features might block the viewing of one or more audiovisual display units.

Images and/or video captures may be used to classify objects that are relevant to audience viewership. Classification of object types by image or video data can be performed, for example, by comparing the known image patterns of target object types (e.g., pedestrians, automobiles, motorcycles, bicycles, trucks, etc.) to the images or videos collected by the camera components. Images and video captures may be analyzed to perform face identification within the image or videos, indicating the presence of an audience member within viewing range of the selected media. For example, anonymous video analytic (AVA) software allows counting of faces without violating the privacy of persons in the image or determining the identity of particular persons.

Identifying audience viewership for mobile advertisements, such as a digital billboard affixed to a mobile vehicle, can be difficult due to the mobile advertisement and audience movement patterns. A potential media viewer could be looking in the direction of a display, but not necessarily at the display. Therefore, views must be inferred and not guaranteed. This inference is made by fusing data collected by the media display client system and one of the most important data points is the video footage, which can be obtained from a camera. This data can be analyzed by a neural network consisting of one or more trained AI/ML models. Specifically, at least one AI/ML model trained for visual object detection and/or classification. Frame-by-frame video analysis could be used to detect people and/or vehicles facing directions positioned towards a media display client system. Other data points can include proximity, the speed of audience compared to the speed of the media display system 170, the duration of a detected audience view, or display view obstruction instances, such as weather or debris blocking the media display view from potential audience viewership.

In some example embodiments, dedicated AI/ML hardware/compute can be used to power the AI/ML software. Processing hardware examples include but is not limited to one or more central processing unit (CPU), graphics processing unit (GPU), tensor processing unit (TPU), quantum processing unit (QPU), or photonic processing unit (PPU) dedicated to processing a neural network. Any of the examples listed above could also be used in isolation or in combination to provide computing processing power for the AI/ML software.

What is claimed is:

1. A system for displaying digital media packages on a mobile vehicle, comprising:
   non-transitory computer-readable storage media;
   a processing system;

an interface system, including a communications interface and an audio-video interface;

a media display client system and apparatus, comprising:
a protective enclosure comprising a base platform;
mounting hardware operable to affix the protective enclosure to the mobile vehicle;
one or more audiovisual display units housed inside the protective enclosure, wherein the one or more audiovisual display units are connected, via an interface system, to a computing system comprising the interface system;
a processing system;
non-transitory computer-readable storage media;
a GPS component;
an object sensor component array, wherein the object sensor component array is connected via the interface system to the computing system; and
program instructions stored on the computer-readable storage media that, when executed by the processing system, direct the processing system to:
periodically, at a media package request time interval, (i) obtain GPS sensor data from the GPS component, wherein the GPS sensor data comprises location data, date data, and time data, and (ii) via the communications interface, send a media package request comprising the GPS sensor data to a media selection service; and
in response to receiving, from the media selection service via the communications interface, a media package comprising an ordered set of media according to a media schedule, and media presentation parameters for each of the media including a geofence region constraint, a date range constraint, and a timeframe range constraint, initiate a media session by:
determining a selected media from the ordered set of media corresponding to the media schedule and media presentation parameters; rendering the selected media on the one or more audiovisual display units; periodically, at a monitoring time interval, gathering session monitoring data comprising (i) object sensor data obtained from the object sensor component array comprising audience estimation data points, and (ii) updated GPS sensor data comprising updated location data, speed and direction data, updated date data, and updated time data obtained from the GPS component; storing the session monitoring data in a session data package on the computer readable storage media; and
if either the updated location data is outside the geofence region constraint, the updated date data is outside the date range constraint, or the updated time data is outside the timeframe range constraint, then (i) terminate the media session by at least:
(a) terminating the rendering of the selected media on the one or more audiovisual display units, (b) terminating the gathering of session monitoring data, and (c) terminating the comparison of the updated GPS sensor data and the media presentation parameters;
(ii) transmit the session data package to the media management system/service via the communications interface; and
(iii) initiate a next media session.

2. The system of claim 1, further comprising hardware and software defining one or more neural networks, wherein the neural network software is trained on visual object detection.

3. The system of claim 2, wherein the neural network hardware is dedicated to processing the neural network software.

4. The media display client system and apparatus of claim 1, wherein one or more components of the computing system are housed inside the protective enclosure.

5. The media display client system and apparatus of claim 1, wherein one or more components of the computing system are housed within a body of the mobile vehicle.

6. The media display client system and apparatus of claim 1, wherein one or more component of the object sensor component array is one of housed inside the enclosure or affixed to an outside of the enclosure.

7. The media display client system and apparatus of claim 1, wherein one or more component of the object sensor component array is one of affixed to or within a body of the mobile vehicle.

8. The media display client system and apparatus of claim 1, further comprising a battery cell housed inside the protective enclosure operable to provide power to one or more of the audiovisual display units, the object sensor component array, and the computing system.

9. The media display client system and apparatus of claim 1, wherein the mounting hardware is operable to adjust one or more of: a height of the base platform above the mobile vehicle mounting surface; a centering of the base platform on the mounting surface of the mobile vehicle; and a tilt of the base platform.

10. The media display client system and apparatus of claim 1, further comprising an HVAC system operable to regulate at least one of a temperature and a humidity within the protective enclosure.

11. The media display client system and apparatus of claim 1, wherein the object sensor component array comprises at least one camera component operative to capture a still image or a video.

12. The media display client system and apparatus of claim 1, wherein the object sensor component array comprises one or more RADAR component.

13. The media display client system and apparatus of claim 1, wherein the object sensor component array comprises one or more LIDAR component.

14. The media display client system and apparatus of claim 1, wherein at least one component of the object sensor component array is integrated into a mobile vehicle system, wherein the mobile vehicle system is operable to communicate with the media display client system via the communications interface.

15. The media display client system and apparatus of claim 1, wherein the GPS component is integrated into a mobile vehicle system, wherein the mobile vehicle system is operable to communicate with the media display client system via the communications interface.

16. The media display client system and apparatus of claim 1, wherein a power state or brightness level or contrast level of at least one of the one or more audiovisual display units adjusts in accordance with the updated GPS sensor data.

17. The media display client system and apparatus of claim 1, further comprising program instructions stored on the computer-readable storage media that, when executed by the processing system, direct the processing system to:

provide one or more user interface functions from which a user-operator of the media display client system configures, controls, and monitors operations of the media display client system.

18. The media display client system and apparatus of claim 1, further comprising program instructions stored on the computer-readable storage media that, when executed by the processing system, direct the processing to:

in response to receiving, via the communications interface, a media package request from a media display client, wherein the media package request comprises GPS sensor data including location data, date data, and time data of the media display client:

select media for a media package, wherein the location data, date data, and time data match media presentation parameters for each media, the media presentation parameters comprising a geofence region constraint, a date range constraint, and a timeframe range constraint;

determine, using the media and media presentation parameters for the selected media, a media schedule and arrange the media as an ordered set;

send, to the media display client via the communications interface, the media package comprising the selected media arranged as the ordered set, the media schedule, and the media presentation parameters for each media in the ordered set; and in response to receiving, from the media display client, a session data package, store, on a session data store located on the computer-readable storage media, the session data package.

\* \* \* \* \*